(12) United States Patent
Lim et al.

(10) Patent No.: US 10,684,979 B2
(45) Date of Patent: Jun. 16, 2020

(54) MEMORY SYSTEM FOR SUPPORTING INTERNAL DQ TERMINATION OF DATA BUFFER

(71) Applicant: Samsung Electronics Co., Ltd., Suwon-si, Gyeonggi-do (KR)

(72) Inventors: Sun-young Lim, Hwaseong-si (KR); Hui-chong Shin, Seongnam-si (KR); In-su Choi, Hwaseong-si (KR); Young-ho Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/671,601

(22) Filed: Nov. 1, 2019

(65) Prior Publication Data

US 2020/0065289 A1   Feb. 27, 2020

Related U.S. Application Data

(63) Continuation of application No. 15/916,929, filed on Mar. 9, 2018, now Pat. No. 10,496,584.

(30) Foreign Application Priority Data

May 11, 2017   (KR) .......................... 10-2017-0058904
Aug. 11, 2017   (KR) .......................... 10-2017-0102574

(51) Int. Cl.
*G06F 12/02* (2006.01)
*G06F 13/40* (2006.01)
*G06F 3/06* (2006.01)

(52) U.S. Cl.
CPC ........ *G06F 13/4086* (2013.01); *G06F 3/0614* (2013.01); *G06F 3/0656* (2013.01); *G06F 3/0659* (2013.01); *G06F 12/0246* (2013.01)

(58) Field of Classification Search
CPC .... G06F 3/0614; G06F 3/0656; G06F 3/0659; G06F 12/0246; G06F 13/4086
See application file for complete search history.

(56) References Cited

U.S. PATENT DOCUMENTS

| | | | |
|---|---|---|---|
| 7,411,859 B2 * | 8/2008 | Sohn .................... | G11C 7/1075 365/189.05 |
| 7,479,799 B2 | 1/2009 | Raghavan et al. | |

(Continued)

FOREIGN PATENT DOCUMENTS

| | | |
|---|---|---|
| JP | 5670565 B2 | 2/2015 |
| JP | 6007323 B2 | 10/2016 |
| KR | 10-2006-0031109 A | 4/2006 |

OTHER PUBLICATIONS

Written Opinion and Search Report dated Oct. 29, 2018 issued in the corresponding Application No. 10201803505T.

*Primary Examiner* — Alexander H Taningco
*Assistant Examiner* — Kurtis R Bahr
(74) *Attorney, Agent, or Firm* — Harness, Dickey & Pierce, P.L.C.

(57) ABSTRACT

A memory system configured to support internal data (DQ) termination of a data buffer is provided. The memory system includes a first memory module, which is a target memory module accessed by an external device, and a second memory module, which is a non-target memory module not accessed by the external device. The second memory module performs the internal DQ termination on an internal data path during an internal operation mode in which data communication is performed by using the internal data path between internal memory chips. Signal reflection over the internal data path is reduced or prohibited due to the internal DQ termination, and thus, signal integrity is improved.

20 Claims, 14 Drawing Sheets

(56) References Cited

U.S. PATENT DOCUMENTS

| | | | |
|---|---|---|---|
| 7,716,411 B2* | 5/2010 | Panabaker | G06F 12/06 |
| | | | 711/101 |
| 8,274,308 B2 | 9/2012 | McCall et al. | |
| 8,539,145 B1* | 9/2013 | Warnes | G06F 13/1684 |
| | | | 711/105 |
| 9,158,726 B2* | 10/2015 | Xu | G06F 13/4086 |
| 9,166,583 B2 | 10/2015 | Oh et al. | |
| 9,183,901 B2* | 11/2015 | Kim | G11O 5/063 |
| 9,432,018 B2* | 8/2016 | Park | H03K 19/0013 |
| 2008/0112233 A1* | 5/2008 | Woo | G11C 7/1045 |
| | | | 365/189.05 |
| 2009/0063761 A1 | 3/2009 | Gower et al. | |
| 2009/0284281 A1 | 11/2009 | Oh et al. | |
| 2011/0095783 A1 | 4/2011 | Ferolito et al. | |
| 2013/0086309 A1* | 4/2013 | Lee | G06F 12/0246 |
| | | | 711/103 |
| 2014/0185374 A1 | 7/2014 | Ramachandra | |
| 2015/0084672 A1 | 3/2015 | Oh et al. | |
| 2015/0261446 A1 | 9/2015 | Lee | |
| 2015/0331817 A1 | 11/2015 | Han et al. | |
| 2016/0065212 A1* | 3/2016 | McCall | G11C 7/1045 |
| | | | 326/30 |
| 2016/0092351 A1* | 3/2016 | Uematsu | G06F 12/0246 |
| | | | 711/103 |
| 2016/0203065 A1* | 7/2016 | Benedict | G11C 7/1012 |
| | | | 714/6.3 |
| 2016/0291894 A1 | 10/2016 | Yeung et al. | |
| 2016/0314822 A1 | 10/2016 | Yeung et al. | |
| 2017/0093400 A1 | 3/2017 | Bains et al. | |
| 2017/0178750 A1* | 6/2017 | Kang | G11C 11/4074 |

\* cited by examiner

FIG. 7

| Operation Mode | Target DIMM1 | | Non-Target DIMM2 | | | |
| --- | --- | --- | --- | --- | --- | --- |
| | | | Internal Operation Mode | | Normal Mode | |
| | ODT1 | ODT2 | ODT1 | ODT2 | ODT1 | ODT2 |
| Read | OFF | ON | ON | ON | ON | OFF |
| | OFF | ON | OFF | ON | OFF | OFF |
| Write | ON | OFF | ON | ON | ON | OFF |
| | ON | OFF | OFF | ON | OFF | OFF |

Internal DQ Termination (a) With Internal DQ Termination of DB    (b) Without Internal DQ Termination of DB

MEMORY SYSTEM FOR SUPPORTING INTERNAL DQ TERMINATION OF DATA BUFFER

CROSS-REFERENCE TO RELATED APPLICATION

This application is a continuation of U.S. application Ser. No. 15/916,929, filed on Mar. 9, 2018, which claims the benefit of Korean Patent Application Nos. 10-2017-0058904, filed on May 11, 2017, and 10-2017-0102574, filed on Aug. 11, 2017, in the Korean Intellectual Property Office, the disclosures of each of which are incorporated herein in their entirety by reference.

BACKGROUND

Inventive concepts relate to a memory system, and more particularly, to a memory module having a data buffer configured to perform, in an internal operation mode of the memory module, internal data (DQ) termination which may increase signal integrity, and/or an operating method of the memory module.

In a field of information processing apparatuses, such as servers, etc., desires for high speed access to high capacity data, such as a database (DB), have been increased, as the big data era has advanced. A bottleneck of an operation capacity of an information processing apparatus dealing with big data, such as a server, etc., is a data loading capability. In order to improve the performance of the information processing apparatus, connecting a high capacity memory to a central processing unit (CPU) memory bus connected to the CPU and having a wide range of processing may be considered.

Flash memories have successfully entered into consumer and enterprise applications by using high performance products. Flash memories having a high data rate are arranged in the CPU memory bus. A nonvolatile dual inline memory module (NVDIMM), in which the flash memory is arranged in the CPU memory bus, has been developed. The NVDIMM has both a high speed processing technique of dynamic random-access memory (DRAM) and a high capacity of the flash memory. The NVDIMM has drawn attention as demands for big data, clouds, artificial intelligence (AI), a high speed network, etc., have increased.

SUMMARY

Inventive concepts provide a memory module having a data buffer configured to perform, in an internal operation mode of the memory module, internal data (DQ) termination to increase signal integrity, and/or an operating method of the memory module.

According to an example embodiment of inventive concepts, there is provided a memory module including a plurality of first memory chips, a plurality of second memory chips, a controller configured to control an internal operation mode in which data communication is performed between the plurality of first memory chips and the plurality of second memory chips, and a plurality of data buffers connected to the plurality of second memory chips, respectively, wherein the controller is configured to control the internal operation mode such that during the internal operation mode, internal data (DQ) termination is performed on an internal data path, connecting the plurality of data buffers with the plurality of second memory chips.

According to an example embodiment of inventive concepts, there is provided a memory system including a first memory module connected to a data bus, the first memory module being a target memory module accessed by an external device of the memory system, and a second memory module connected to the data bus, the second memory module being a non-target memory module not accessed by the external device, wherein the second memory module is configured to perform internal data (DQ) termination on an internal data path, during an internal operation mode in which data communication is performed by using the internal data path of the second memory module.

According to an example embodiment of inventive concepts, there is provided an operating method of a memory system including first and second memory modules, the operating method including accessing the first memory module through an external device of the memory system, performing an internal operation mode by using an internal data path, in the second memory module not accessed by the external device, and performing internal data (DQ) termination on the internal data path, during the internal operation mode of the second memory module.

BRIEF DESCRIPTION OF THE DRAWINGS

Example embodiments of inventive concepts will be more clearly understood from the following detailed description taken in conjunction with the accompanying drawings in which:

FIG. 7 is a table showing an on/off operation of an on-die-termination (ODT) circuit of FIG. 1, based on an operation mode;

DETAILED DESCRIPTION OF THE EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1:
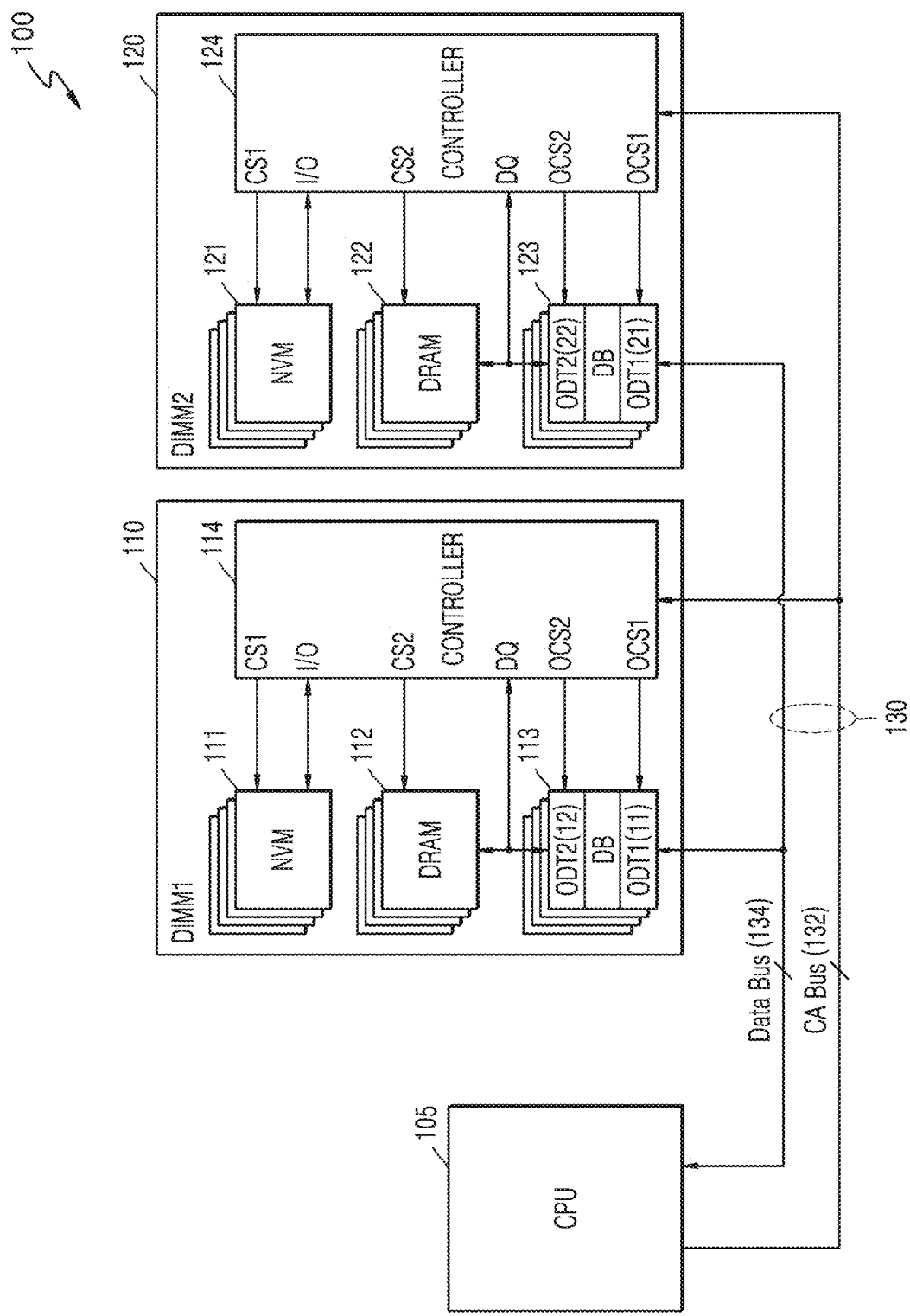
FIG. 1 is a block diagram of a memory system according to an example embodiment.

FIG. 1 is a block diagram of a memory system 100 according to an example embodiment.

Referring to FIG. 1, the memory system 100 may include first and second memory modules 110 and 120 and may be accessed by a central processing unit CPU 105. The CPU 105 may include an operation unit, e.g. a CPU core, a cache memory, and/or a memory controller configured to control the first and second memory modules 110 and 120. The first and second memory modules 110 and 120 may be nonvolatile dual inline memory modules (NVDIMMs) having a plurality of packaged memory devices or memory chips. According to an example embodiment, two memory modules, for example, the first and second memory modules 110 and 120 in the memory system 100 are described. However, inventive concepts are not limited thereto, and may include various numbers of memory modules.

In the memory system 100, any one of the first and second memory modules 110 and 120, on which an access operation of the CPU 105 is performed, will be referred to as a target memory module, and the first or second memory module 110 or 120, on which the access operation of the CPU 105 is not performed, will be referred to as a non-target memory module. The first memory module 110 will be described as a target memory module Target DIMM1 and the second memory module 120 will be described as a non-target memory module Non-Target DIMM2.

The first and second memory modules 110 and 120 may be homogeneous NVDIMMs, as illustrated in FIG. 1. The first and second memory modules 110 and 120 are examples and the first and second memory modules 110 and 120 do not limit the scope of inventive concepts. According to example embodiments, the first and second memory modules 110 and 120 may be heterogeneous NVDIMMs.

Each of the first and second memory modules 110 and 120 may include a plurality of memory chips, such as non-volatile memory chips 111 or 121 (hereinafter, referred to as "NVM chips") and dynamic random-access memory (DRAM) chips 112 or 122. Also, each of the first and second memory modules 110 and 120 may include a plurality of data buffers 113 or 123 connected to the DRAM chips 112 or 122. The data buffers 113 or 123 may be implemented as single chips corresponding to the DRAM chips 112 or 122. Also, each of the first and second memory modules 110 and 120 may include a controller 114 or 124 connected to the NVM chips 111 or 121, the DRAM chips 112 or 122, and the data buffers 113 or 123. The controllers 114 or 124 may be implemented as single chips configured to control the NVM chips 111 or 121, the DRAM chips 112 or 122, and the data buffers 113 or 123. According to example embodiments, the controllers 114 and 124 may be implemented as multiple chips.

The NVM chips 111 and 121 may be or may include non-volatile memory devices configured to store data in a non-volatile way. For example, the NVM chips 111 and 121 may be or may include flash memory devices including flash memory cells. Alternatively or additionally, the NVM chips 111 and 121 may be or may include memory devices, such as resistance random-access memory (ReRAM), magnetic random-access memory (MRAM), phase-change random-access memory (PCRAM), or the like, which include resistive memory cells. Hereinafter, embodiments will be described assuming that the NVM chips 111 and 121 are flash memory devices including NAND or NOR flash memory cells.

The DRAM chips 112 and 122 may be volatile memory devices. The DRAM chips 112 and 122 may be or may include clock synchronization-type DRAM chips, such as synchronous DRAM (SDRAM). For example, the DRAM chips 112 and 122 may be memory devices, such as double data rate (DDR) SDRAM, low power DDR (LPDDR) SDRAM, graphics DDR (GDDR) SDRAM, Rambus DRAM (RDRAM®), etc.

The first and second memory modules 110 and 120 may be mounted in a dual inline memory module (DIMM) socket provided in a main board of the memory system 100, so as to contact a memory bus 130. The memory bus 130 refers to signal lines formed on a surface of or in the main board of the memory system 100. The CPU 105 may be connected to the first and second memory modules 110 and 120 through the memory bus 130. The memory bus 130 may include a command/address/control bus 132 (hereinafter, referred to as a "CA bus,") and a data bus 134.

A command signal, an address signal, and/or a control signal applied from the CPU 105 and used to access the first and second memory modules 110 and 120 may be transmitted to the CA bus 132. When the first memory module 110 is a target memory module accessed by the CPU 105, the CPU 105 may transmit the command signal, the address signal, and/or the control signal for a write/read operation to/from the first memory module 110 to the first memory module 110 through the CA bus 132. When the second memory module 120 is a target memory module, the CPU 105 may transmit the command signal, the address signal, and/or the control signal for a write/read operation to/from the second memory module 120 to the second memory module 120 through the CA bus 132. When the first or the second memory module 110 or 120 is a non-target memory module, the CPU 105 may transmit the command signal commanding an internal operation mode of the first or the second memory module 110 or 120 to the first or the second memory module 110 or 120 through the CA bus 132.

Data that is exchanged between the CPU 105 and the first or the second memory module 110 or 120 may be transmitted to the data bus 134. When the first memory module 110 is the target memory module, the CPU 105 may transmit the data to be written to the first memory module 110 to the first memory module 110 through the data bus 134, and may receive the data read from the first memory module 110 through the data bus 134. When the second memory module 120 is the target memory module, the CPU 105 may transmit the data to be written to the second memory module 120 to the second memory module 120 through the data bus 134, and may receive the data read from the second memory module 120 through the data bus 134.

In the first memory module 110, the plurality of NVM chips 111 may be driven in response to a first chip selection signal CS1, and the plurality of DRAM chips 112 may be driven in response to a second chip selection signal CS2. According to example embodiments, the plurality of DRAM chips 112 may be driven in response to the first chip selection signal CS1 and the plurality of NVM chips 111 may be driven in response to the second chip selection signal CS2.

When the first memory module 110 is the target memory module, the first and second chip selection signals CS1 and CS2 may be applied to the controller 114 from the CPU 105 through the CA bus 132. When the first chip selection signal CS1 is activated, the controller 114 may control a write operation to the NVM chips 111 and/or a read operation from the NVM chips 111. When the second chip selection signal CS2 is activated, the controller 114 may control a write operation to the DRAM chips 112 and/or a read operation from the DRAM chips 112.

When the controller 114 of the first memory module 110 controls the write operation of the NVM chips 111 based on the first chip selection signal CS1, data to be written to the NVM chips 111 may be applied to the data buffers 113 through the data bus 134. The controller 114 may receive write data DQ of the data buffers 113, organize the write data DQ, and provide the write data DQ as write data I/O of the NVM chips 111. The controller 114 may control the write data I/O to be written, e.g. programmed, to the NVM chips 111.

The controller 114 may include a flash transition layer (FTL) and/or a mapping table. The controller 114 may perform management with respect to write, read, and erase operations, etc., of the NVM chips 111 by using the FTL and/or the mapping table. The FTL may convert an address for example, a logical address, provided from the CPU 105 into a physical address indicating a physical location of a memory cell to be actually accessed by the NVM chips 111. The FTL may generate the physical address by performing a conversion operation with respect to the logical address, based on a mapping unit having a specific, (or, alternatively, predetermined), size, and may provide the generated physical address to the NVM chips 111. The mapping table may store mapping information between the logical address from the CPU 105 and the physical address of the NVM chips 111, the physical address corresponding to the logical address. The controller 114 may convert the logical address into the physical address with reference to the mapping information. The NVM chips 111 may write the write data I/O to memory cells corresponding to the physical address.

When the controller 114 of the first memory module 110 controls the read operation of the NVM chips 111 based on the first chip selection signal CS1, the controller 114 may convert a logical address provided from the CPU 105 into a physical address and may provide the converted physical address to the NVM chips 111. The NVM chips 111 may read data I/O from memory cells corresponding to the physical address. The controller 114 may receive the data I/O from the NVM chips 111, may process the data I/O in a data access unit, and may provide the data I/O as read data DQ of the data buffers 113. The controller 114 may control the read data DQ of the data buffers 113 to be transmitted to the data bus 134 and provided to the CPU 105.

When the controller 114 of the first memory module 110 controls the write operation of the DRAM chips 112 based on the second chip selection signal CS2, data to be written to the DRAM chips 112 may be applied to the data buffers 113 through the data bus 134. The controller 114 may control write data DQ of the data buffers 113 to be written to the DRAM chips 112.

When the controller 114 of the first memory module 110 controls the read operation of the DRAM chips 112 based on the second chip selection signal CS2, the controller 114 may control data DQ read from the DRAM chips 112 to be transmitted to the data bus 134 and provided to the CPU 105 through the data buffers 113.

In the second memory module 120, the plurality of NVM chips 121 may be driven in response to the first chip selection signal CS1 and the plurality of DRAM chips 122 may be driven in response to the second chip selection signal CS2. When the second memory module 120 is the target memory module, the first and second chip selection signals CS1 and CS2 may be applied to the controller 124 from the CPU 105 through the CA bus 132. When the first chip selection signal CS1 is activated, the controller 124 may control a write operation to the NVM chips 121 and/or a read operation from the NVM chips 121. When the second chip selection signal CS2 is activated, the controller 124 may control a write operation to the DRAM chips 122 and/or a read operation from the DRAM chips 122.

When the controller 124 of the second memory module 120 controls the write operation of the NVM chips 121 based on the first chip selection signal CS1, data to be written to the NVM chips 121 may be applied to the data buffers 123 through the data bus 134. The controller 124 may receive write data DQ of the data buffers 123, organize the write data DQ, and provide the write data DQ as write data I/O of the NVM chips 121. The controller 124 may control the write data I/O to be written to the NVM chips 121.

When the controller 124 of the second memory module 120 controls the read operation of the NVM chips 121 based on the first chip selection signal CS1, the controller 124 may receive the data I/O read from the NVM chips 121, process the data I/O in a data access unit, and provide the data I/O as read data DQ of the data buffers 123. The controller 124 may control the read data DQ of the data buffers 123 to be transmitted to the data bus 134 and provided to the CPU 105.

When the controller 124 of the second memory module 120 controls the write operation of the DRAM chips 122 based on the second chip selection signal CS2, data to be written to the DRAM chips 122 may be applied to the data buffers 123 through the data bus 134. The controller 124 may control write data DQ of the data buffers 123 to be written to the DRAM chips 122.

When the controller 124 of the second memory module 120 controls the read operation of the DRAM chips 122 based on the second chip selection signal CS2, the controller 124 may control the data DQ read from the DRAM chips 122 to be transmitted to the data bus 134 and provided to the CPU 105 through the data buffers 123.

As a speed of signal transmission between the CPU 105 and the first and second memory modules 110 and 120 increases, a delay time for the signal transmission is desired to be reduced or minimized. To this end, a swing range of a signal interfaced between the CPU 105 and the first and second memory modules 110 and 120 has been decreased. As the swing range of the signal is decreased, an effect on external noise increases, and signal reflection from an interface terminal due to impedance mismatching becomes important. When impedance mismatching occurs in a process of signal transmission, a signal integrity issue occurs. In order to increase the signal integrity by minimizing the signal reflection from the interface terminal between the CPU 105 and the first and second memory modules 110 and 120, an impedance matching circuit, which may be referred to as an on-die-termination (ODT) circuit, may be adopted.

The data buffers 113 and 123 of the first and second memory modules 110 and 120 may be arranged in the interface terminals between the CPU 105 and the first and second memory modules 110 and 120. Each of the data buffers 113 and 123 of the first and second memory modules 110 and 120 may include a first ODT circuit 11 or 21 and a second ODT circuit 12 or 22. The first ODT circuits 11 and 21 and the second ODT circuits 12 and 22 may perform an ODT operation in response to the first and second ODT control signals OCS1 and OCS2 from the controllers 114 and 124 of the first and second memory modules 110 and 120.

The first ODT circuits 11 and 21 and the second ODT circuits 12 and 22 may be selectively turned on or off based on operation modes of the first and second memory modules 110 and 120, such as an access operation mode, a normal mode, and/or an internal operation mode. Hereinafter, the operation modes of the first and second memory modules 110 and 120 will be described in detail.

Figure 2:
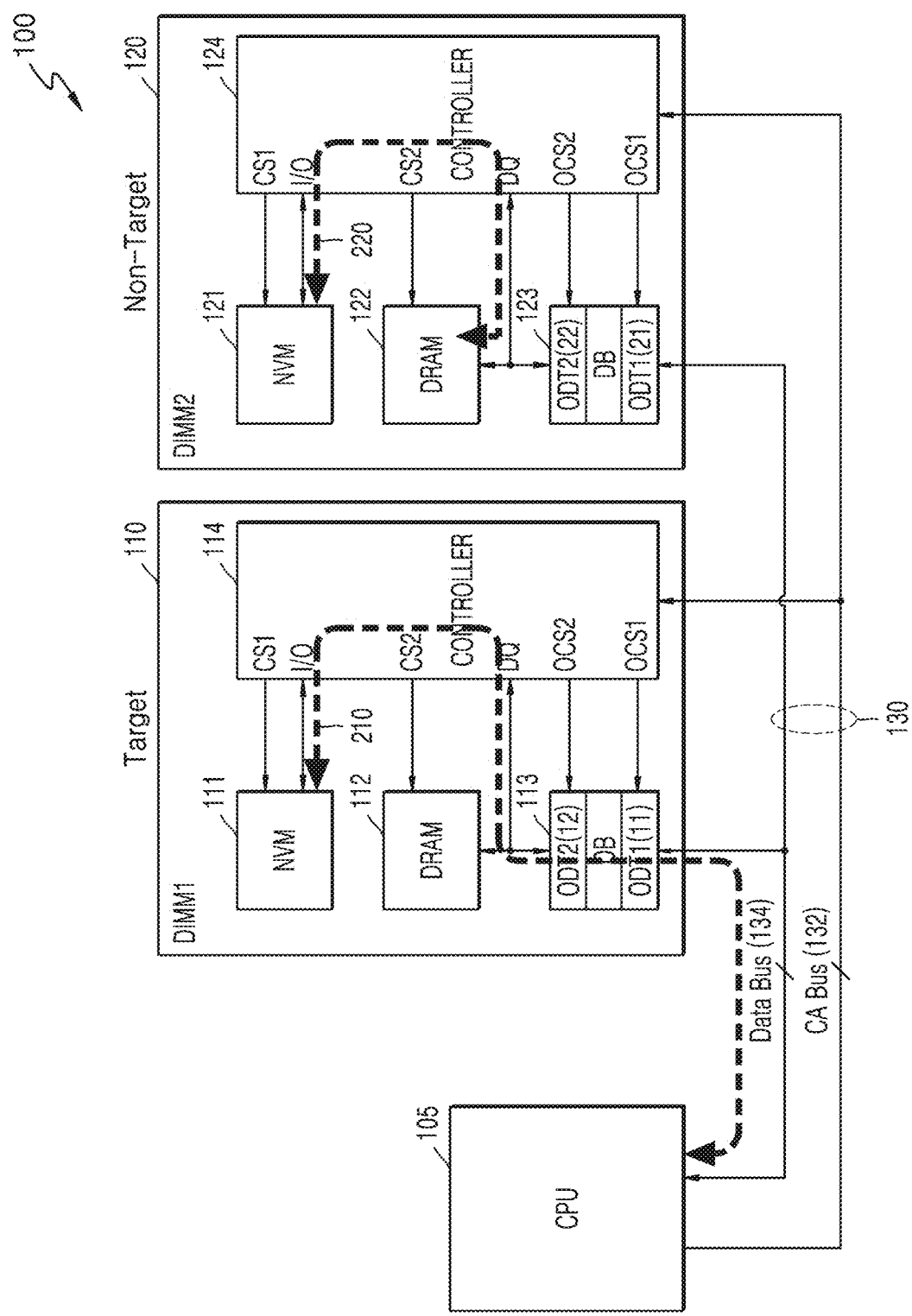
FIGS. 2 and 3 are diagrams for describing an access operation mode and an internal operation mode with respect to the memory system of FIG. 1.
Figure 3:
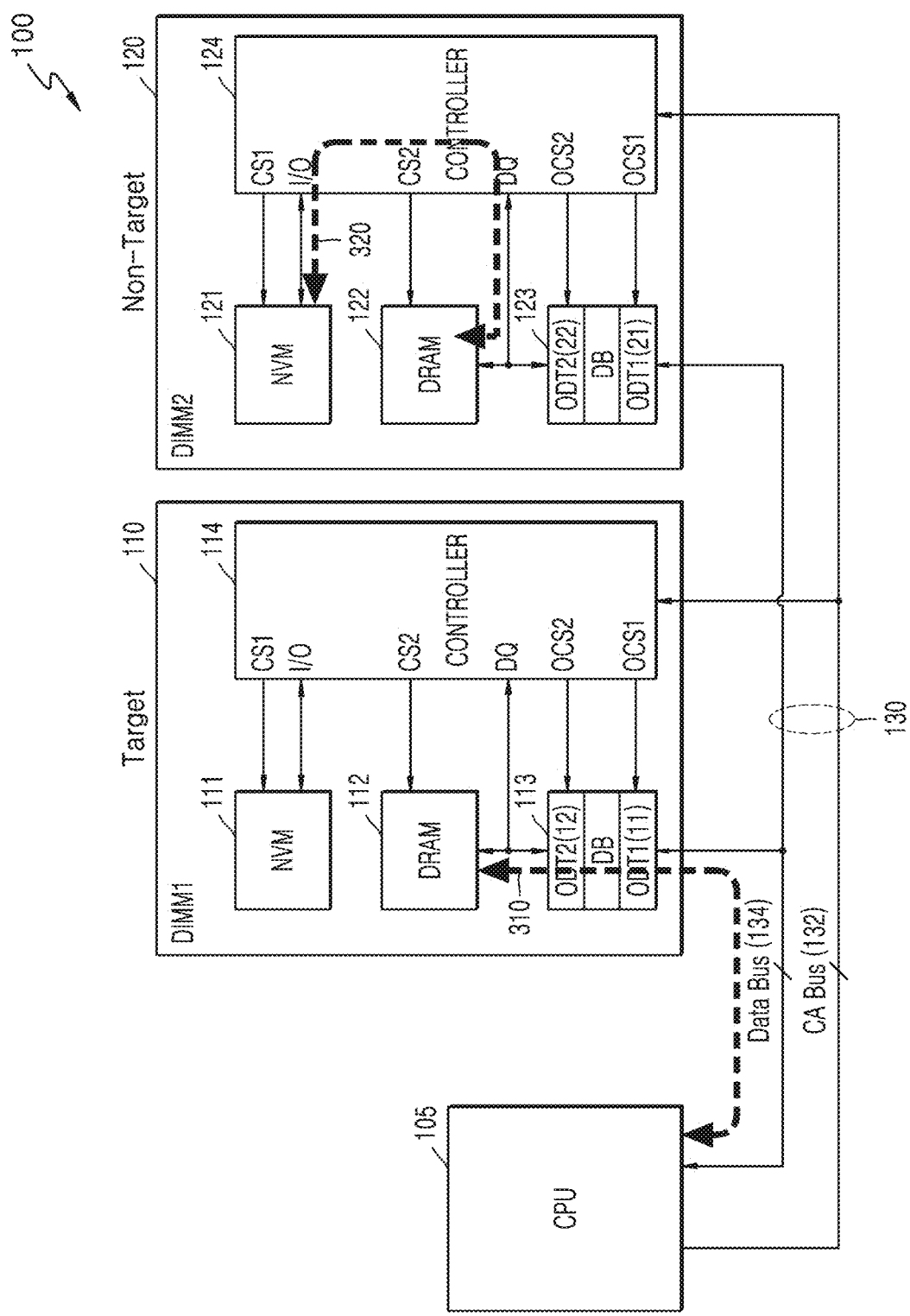

FIGS. 2 and 3 are diagrams for describing an access operation mode and an internal operation mode with respect to the memory system 100 of FIG. 1. FIG. 2 describes that the CPU 105 accesses the NVM chips 111 of the first memory module 110, and the access operation mode in which the DRAM chips 112 are accessed is described with reference to FIG. 3. In FIGS. 2 and 3, the second memory module 120 may operate in the internal operation mode.

Referring to FIG. 2, for brevity of description, each of the first and second memory modules 110 and 120 shows one NVM chip 111 or 121, one DRAM chip 112 or 122, and one data buffer 113 or 123 corresponding to the DRAM chip 112 or 122, from among the plurality of memory chips described with reference to FIG. 1; however, inventive concepts are not limited thereto. The NVM chip 111 of the first memory module 110 indicates a memory chip on which the access operation of the CPU 105 is performed, and the NVM chip 121 and the DRAM chip 122 of the second memory module 120 indicate memory chips which operate in the internal operation mode without involving the CPU 105.

When the first memory module 110 is a target memory module, the CPU 105 may perform the access operation with respect to the first memory module 110 through the CA bus 132 and the data bus 134. The CPU 105 may transmit a command signal, an address signal, and/or a control signal for a write/read operation to/from the first memory module 110 to the controller 114 of the first memory module 110 through the CA bus 132.

Along with the command signal, the address signal, and/or the control signal for the write operation to the first memory module 110, the CPU 105 may transmit the first chip selection signal CS1 for driving the NVM chip 111 to the controller 114 through the CA bus 132. Also, the CPU 105 may transmit data to be written to the NVM chip 111 to the data buffer 113 of the first memory module 110 through the data bus 134. An access data path 210 including the data bus 134, the data buffer 113, and the controller 114 may be formed between the CPU 105 and the NVM chip 111. Write/read data DQ to/from the NVM chip 111 may be transmitted through the access data path 210.

The first ODT circuit 11 of an end of the data buffer 113 of the first memory module 110, the end being for receiving the data to be written to the NVM chip 111, may be controlled to be in an on-state, and the second ODT circuit 12 of an end of the data buffer 113 of the first memory module 110, the end being for transmitting the data to be written to the NVM chip 111, may be controlled to be in an off-state. For example, the controller 114 may control the first ODT circuit 11 to enable a termination resistor in response to the first ODT control signal OCS1 and may control the second ODT circuit 12 not to perform a termination operation.

The controller 114 of the first memory module 110 may receive the write data DQ of the data buffer 113, and may provide the write data DQ as write data I/O of the NVM chips 111 by performing an address conversion operation to convert an address signal, e.g. a logical address, into a physical address based on a mapping unit. The NVM chip 111 may write the write data I/O transmitted through the access data path 210 to memory cells corresponding to the physical address.

The CPU 105 may transmit a command signal, an address signal, and/or a control signal for the read operation from the first memory module 110, and the first chip selection signal CS1 for driving the NVM chip 111, to the controller 114 through the CA bus 132. The controller 114 may perform an address conversion operation in which an address signal, e.g. a logical address, is converted into a physical address, and may provide the converted physical address to the NVM chip 111. The NVM chip 111 may read data I/O from memory cells corresponding to the physical address and provide the data I/O to the controller 114. The controller 114 may receive the data I/O read from the NVM chip 111, process the received data I/O in a data access unit, and provide the data I/O as read data DQ of the data buffer 113.

The second ODT circuit 12 of an end of the data buffer 113 of the first memory module 110, the end being for receiving the data DQ generated by processing the data I/O read from the NVM chip 111 in the data access unit, may be controlled to be in an on-state, and the first ODT circuit 11 of an end of the data buffer 113 of the first memory module 110, the end being for transmitting the data DQ, may be controlled to be in an off-state. For example, the controller 114 may control the second ODT circuit 12 to enable a termination resistor in response to the second ODT control signal OCS2 and may control the first ODT circuit 11 not to perform a termination operation. The controller 114 may control the read data DQ of the data buffer 113 to be transmitted to the data bus 134 and provided to the CPU 105.

When the second memory module 120 is a non-target memory module not accessed by the CPU 105, the second memory module 120 may operate in a normal mode or in an internal operation mode. The normal mode may refer to a mode in which a write or a read operation is not performed. For example, the normal mode may include an idle mode, a pre-charge mode, a power-down mode, a refresh mode, a standby mode, and/or the like.

When the second memory module 120 operates in the normal mode, the first ODT circuit 21 may be selectively turned on or off and the second ODT circuit 22 may be turned off. The controller 124 may control the first ODT circuit 21 to enable a termination resistor in response to the first ODT control signal OCS1. The first ODT circuit 21 may be turned on to provide normal termination resistance to the data bus 134. The controller 124 may control the second ODT circuit 22 not to perform a termination operation. According to example embodiments, the controller 124 may control the first ODT circuit 21 not to perform the termination operation by turning off the first ODT circuit 21.

When the second memory module 120 operates in the internal operation mode, the controller 124 may generate the first and second chip selection signals CS1 and CS2. The controller 124 may perform internal data communication through an internal data path 220 between the NVM chip 121 driven based on the first chip selection signal CS1 and the DRAM chip 122 driven based on the second chip selection signal CS2. The controller 124 may be included in the internal data path 220, and may read data DQ from the DRAM chip 122 and write the data DQ to the NVM chip 121, or may read data I/O from the NVM chip 121 and write the data I/O to the DRAM chip 122.

When the second memory module 120 operates in the internal operation mode, the second ODT circuit 22 of the data buffer 123 may be turned on to perform an internal termination operation. The controller 124 may control the second ODT circuit 22 to enable a termination resistor in response to the second ODT control signal OCS2. When the second ODT circuit 22 is turned on, internal termination resistance may be provided to the internal data path 220 through which the data DQ is loaded into/from the DRAM chip 122. For convenience of explanation, when the second memory module 120 operates in the internal operation mode, the operation of the second ODT circuit 22 for providing the internal termination resistance to the internal data path 220 may be referred to as internal data (DQ) termination.

When the second memory module 120 operates in the internal operation mode and the data DQ is read from the DRAM chip 122 and written to the NVM chip 121, the internal DQ termination of the second ODT circuit 22 may be performed to reduce or prohibit signal reflection over the internal data path 220 due to the data buffer 123. Likewise, when the data I/O is read from the NVM chip 121 and written to the DRAM chip 122, the internal DQ termination of the second ODT circuit 22 may be performed to reduce or prohibit signal reflection over the internal data path 220 due to the data buffer 123. Accordingly, when the second memory module 120 operates in the internal operation mode, the signal reflection over the internal data path 220 due to the data buffer 123 may be reduced or prohibited, so as to increase the signal integrity.

Referring to FIG. 3, the CPU 105 may perform the access operation on the DRAM chip 112 of the first memory module 110 through the CA bus 132 and the data bus 134. The CPU 105 may transmit a command signal, an address signal, and/or a control signal for a write operation to the DRAM chip 112, and the second chip selection signal CS2 for driving the DRAM chip 112, to the controller 114 through the CA bus 132. The CPU 105 may transmit data to be written to the DRAM chip 112 to the data buffer 113 of the first memory module 110 through the data bus 134. The data bus 134, through which the write/read data DQ to/from the DRAM chip 112 is transmitted, and the data buffer 113 may be included in an access data path 310, between the CPU 105 and the DRAM chip 112.

The first ODT circuit 11 of an end of the data buffer 113 of the first memory module 110, the end being for receiving the data to be written to the DRAM chip 112, may be controlled to be in an on-state, and the second ODT circuit 12 of an end of the data buffer 113 of the first memory module 110, the end being for transmitting the data to be written to the DRAM chip 112, may be controlled to be in an off-state. For example, the controller 114 may control the first ODT circuit 11 to enable a termination resistor in response to the first ODT control signal OCS1 and may control the second ODT circuit 12 not to perform a termination operation.

The controller 114 of the first memory module 110 may provide the write data DQ of the data buffer 113 to the DRAM chip 112. The DRAM chip 112 may write the write data DQ transmitted through the access data path 310 to memory cells corresponding to the address signal provided from the CPU 105.

The CPU 105 may transmit a command signal, an address signal, and/or a control signal for a read operation from the DRAM chip 112, and the second chip selection signal CS2 for driving the DRAM chip 112, to the controller 114 through the CA bus 132. The DRAM chip 112 may read the data DQ of memory cells corresponding to the address signal provided from the CPU 105. The controller 114 may control the data DQ read by the DRAM chip 112 to be provided to the CPU 105 through the access data path 310.

The second ODT circuit 12 of an end of the data buffer 113 of the first memory module 110, the end being for receiving the data DQ read by the DRAM chip 112, may be controlled to be in an on-state, and the first ODT circuit 11 of an end of the data buffer 113 of the first memory module 110, the end being for transmitting the data DQ read by the DRAM chip 112, may be controlled to be in an off-state. For example, the controller 114 may control the second ODT circuit 12 to enable a termination resistor in response to the second ODT control signal OCS2 and may control the first ODT circuit 11 not to perform a termination operation.

The second memory module 120 may be the non-target memory module not accessed by the CPU 105, and may operate in the normal mode or the internal operation mode. When the second memory module 120 operates in the normal mode, the first ODT circuit 21 may be selectively turned on or off, and the second ODT circuit 22 may be turned off. The controller 124 may control the first ODT circuit 21 to enable a termination resistor in response to the first ODT control signal OCS1 or may control the first ODT circuit 21 not to perform a termination operation. The controller 124 may control the second ODT circuit 22 not to perform a termination operation.

When the second memory module 120 operates in the internal operation mode, the controller 124 may generate the first and second chip selection signals CS1 and CS2, and may read the data DQ from the DRAM chip 122 and write the data DQ to the NVM chip 121, or may read data I/O from the NVM chip 121 and write the data I/O to the DRAM chip 122, through an internal data path 320 between the NVM chip 121 and the DRAM chip 122.

The controller 124 of the second memory module 120 may control the second ODT circuit 22 to enable a termination resistor in response to the second ODT control signal OCS2 so as to perform internal DQ termination on the internal data path 320. Accordingly, signal reflection over the internal data path 320 due to the data buffer 123 may be reduced or prohibited in the internal operation mode. Likewise, when the data I/O is read from the NVM chip 121 and written to the DRAM chip 122, the internal DQ termination of the second ODT circuit 22 may be performed to reduce or prohibit signal reflection over the internal data path 320 due to the data buffer 123. Accordingly, during the internal operation mode of the second memory module 120, signal reflection over the internal data path 320 due to the data buffer 123 may be reduced or prohibited, and thus, the signal integrity may be improved.

Figure 4:
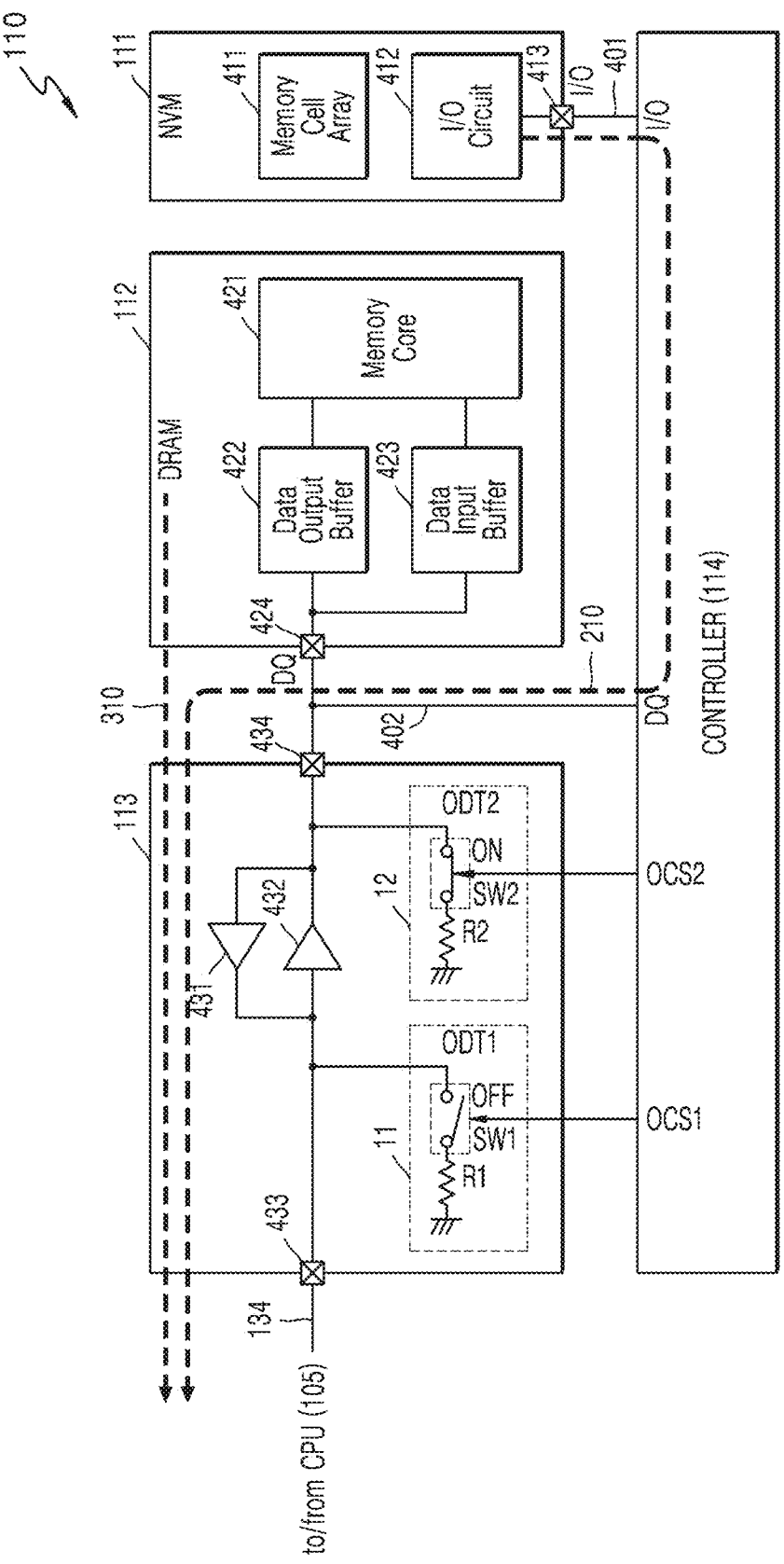
FIGS. 4 and 5 are diagrams for describing a first memory module of FIG. 1, which is a target memory module.
Figure 5:
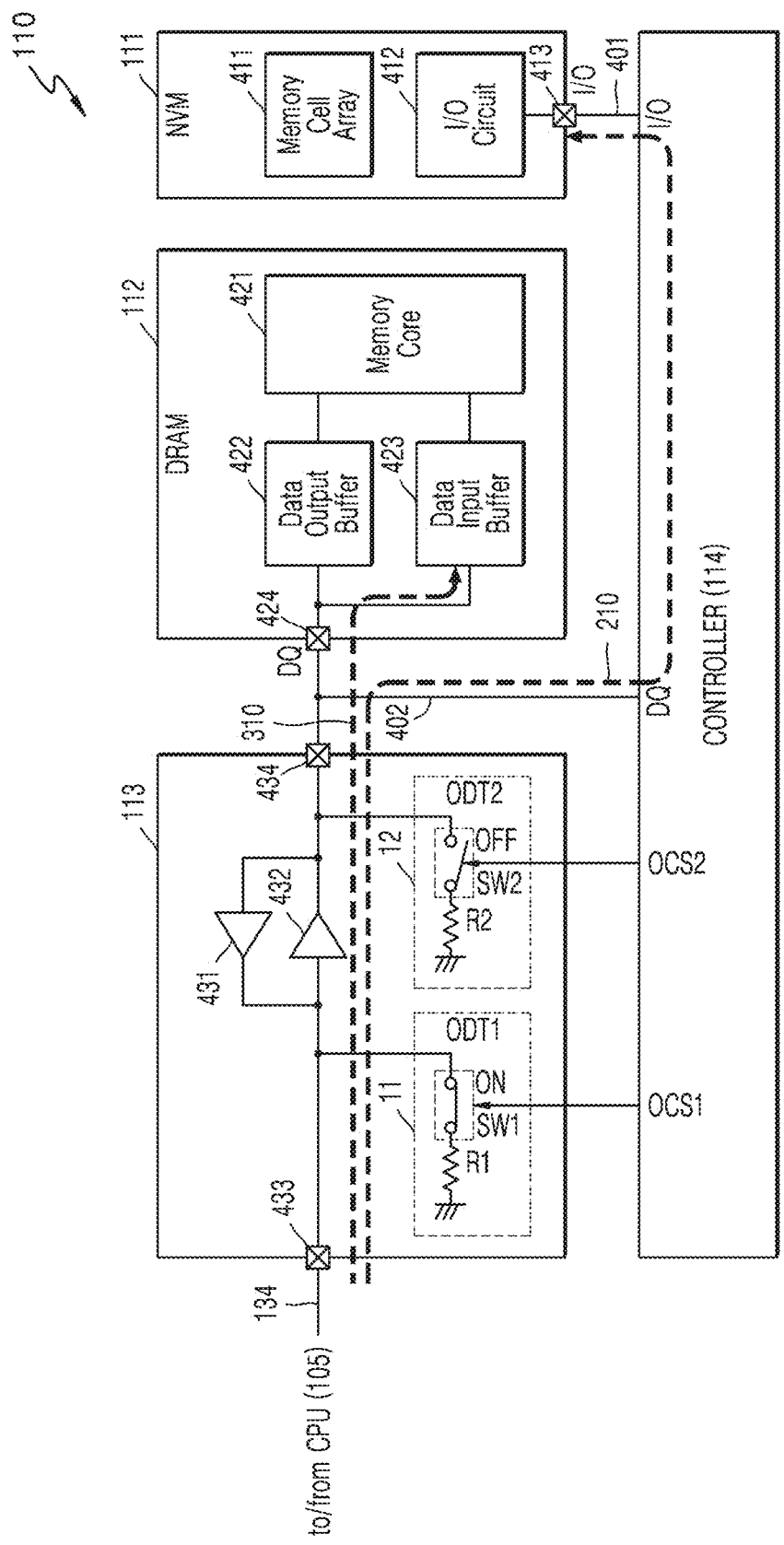

FIGS. 4 and 5 are diagrams for describing the first memory module 110 of FIG. 1, which may be the target memory module. Referring to FIG. 4, a read operation of the first memory module 110 will be described, and referring to FIG. FIG. 5, a write operation of the first memory module 110 will be described.

Referring to FIG. 4, the first memory module 110 may include the NVM chip 111, the DRAM chip 112, the data buffer 113, and the controller 114 in the access data paths 210 and 310 of FIGS. 2 and 3.

The NVM chip 111 may include a memory cell array 411 and an input and output circuit 412. Although not shown, the NVM chip 111 may further include a control logic unit, a voltage generation unit, a row decoder, and/or other elements. The memory cell array 411 may include a plurality of flash memory cells, and may be connected to word lines WL, a string selection line SSL, a ground selection line GSL, and bit lines BL. The memory cell array 411 may be connected to the row decoder through the word lines WL, the string selection line SSL, and the ground selection line GSL, and may be connected to the page buffer through the bit lines BL.

The input and output circuit 412 may temporarily store a command, an address, a control signal, and/or data provided from the controller 114 through an input and output line 401 (hereinafter, referred to as an "I/O line"). The input and output circuit 412 may be connected to a memory cell array 411 through the bit lines BL. The input and output circuit 412 may be connected to an input and output pin 413 (hereinafter, referred to as an "I/O pin"). Here, the term "pin" widely refers to electrical interconnection with respect to an integrated circuit, and may include, for example, different electrical points of contact on a pad of the integrated circuit.

The input and output circuit 412 may temporarily store read data I/O of the memory cell array 411 and may output the read data I/O to the controller 114 through the I/O pin 413 and the I/O line 401. The input and output circuit 412 may receive write data I/O from the controller 114 through the I/O line 401 and the I/O pin 413 and may write (or program) the write data I/O to the memory cell array 411. The input and output circuit 412 may include components, such as a column selection gate, a page buffer, a data buffer, and/or other elements.

The DRAM chip 112 may include a memory core 421, a data output buffer 422, and/or a data input buffer 423. Although not shown, the DRAM chip 112 may further include a command/address buffer, a command decoder, a refresh controller, a row decoder, a column decoder, an input and output gating circuit, a write driver, and/or other elements. The memory core 421 may include banks including a plurality of DRAM cells and sense amplifiers connected to the banks. According to example embodiments, the bank of the memory core 421 may include magnetic RAM (MRAM) cells rather than, or in addition to, the DRAM cells.

The memory core 421 may write data DQ provided from the data input buffer 423, may generate read data, and may provide the generated read data to the data output buffer 422. The data output buffer 422 and the data input buffer 423 may be connected to a data input and output pin 424 (hereinafter, referred to as a "DQ pin"). The data output buffer 422 may transmit the read data DQ provided from the memory core 421 to the data buffer 113 through the DQ pin 424 and a data input and output line 402 (hereinafter, referred to as a "DQ line"). The data input buffer 423 may receive the write data DQ provided from the data buffer 113 through the DQ line 402 and the DQ pin 424.

The data buffer 113 may include an output buffer 431 and an input buffer 432. A transmitting end of the output buffer 431 and a receiving end of the input buffer 432 may be connected to a first terminal 433, and a receiving end of the output buffer 431 and a transmitting end of the input buffer 432 may be connected to a second terminal 434. The first terminal 434 may be connected to the data bus 134 and the first ODT circuit 11, and the second terminal 434 may be connected to the DQ line 402 and the second ODT circuit 12. The output buffer 431 may buffer data provided to the second terminal 434 and transmit the buffered data to the data bus 134 through the first terminal 433, and the input buffer 432 may buffer data provided from the CPU 105 through the data bus 134 and the first terminal 433 and transmit the buffered data to the DQ line 402 through the second terminal 434.

The first ODT circuit 11 may include a first switch SW1, and a first resistor R1 selectively connected to the first terminal 433 based on a switching operation of the first switch SW1. The first switch SW1 may be implemented as or may include a transistor which is turned on in response to the first ODT control signal OSC1 provided from the controller 114. The first ODT circuit 11 is illustrated as including a single resistor R1 and a single switch SW1. However, inventive concepts are not limited thereto, and according to example embodiments, the first ODT circuit 11 may include a plurality of resistors connected in parallel, and a plurality of switches configured to control connection of the plurality of resistors.

The second ODT circuit 12 may include a second switch SW2, and a second resistor R2 selectively connected to the second terminal 434 based on a switching operation of the second switch SW2. The second switch SW2 may be implemented as or may include a transistor which is turned on in response to the second ODT control signal OCS2 provided from the controller 114. The second ODT circuit 12 is illustrated as including a single resistor R2 and a single switch SW2. However, inventive concepts are not limited thereto, and according to embodiments, the second ODT circuit 12 may include a plurality of resistors connected in parallel, and a plurality of switches configured to control connection of the plurality of resistors.

When the CPU 105 commands a read operation of the NVM chip 111, the controller 114 may transmit data I/O read from the NVM chip 111 to the CPU 105 through the access data path 210. Here, when the controller 114 activates the second ODT control signal OCS2, the second switch SW2 of the second ODT circuit 12 may be turned on and the second resistor R2 may be electrically connected to the second terminal 434. Also, the controller 114 may inactivate the first ODT control signal OCS1 to turn off the first switch SW1 of the first ODT circuit 11. The first resistor R1 may be electrically disconnected from the first terminal 434 due to the first switch SW1 which is turned off.

When the CPU 105 commands a read operation of the DRAM chip 112, the controller 114 may transmit data DQ read from the DRAM chip 112 to the CPU 105 through the access data path 310. Here, when the controller 114 activates the second ODT control signal OCS2, the second switch SW2 of the second ODT circuit 12 may be turned on and the second resistor R2 may be electrically connected to the second terminal 434. Also, the controller 114 may inactivate the first ODT control signal OCS1 to turn off the first switch SW1 of the first ODT circuit 11. The first resistor R1 may be electrically disconnected from the first terminal 433 due to the first switch SW1 which is turned off.

Referring to FIG. 5, when the CPU 105 commands a write operation to the NVM chip 111, the controller 114 may transmit write data I/O received from the CPU 105 through the data bus 134 and the data buffer 113 to the I/O pin 413 of the NVM chip 111 through the access data path 210. Here, the controller 114 may activate the first ODT control signal OCS1 so that the first switch SW1 of the first ODT circuit 11 is turned on and the first resistor R1 is electrically connected to the first terminal 433. Also, the controller 114 may inactivate the second ODT control signal OCS2 so that the second switch SW2 of the second ODT circuit 12 is turned off and the second resistor R2 is electrically disconnected from the second terminal 434 due to the second switch SW2 which is turned off.

When the CPU 105 commands a write operation to the DRAM chip 112, the controller 114 may transmit write data DQ received from the CPU 105 through the data bus 134 and the data buffer 113 to the DQ pin 424 of the DRAM chip 112 through the access data path 310. Here, the controller 114 may activate the first ODT control signal OCS1 so that the first switch SW1 of the first ODT circuit 11 is turned on and the first resistor R1 is electrically connected to the first terminal 433. Also, the controller 114 may inactivate the second ODT control signal OCS2 so that the second switch SW2 of the second ODT circuit 12 is turned off and the second resistor R2 is electrically disconnected from the second terminal 434 due to the second switch SW2 which is turned off.

Figure 6:
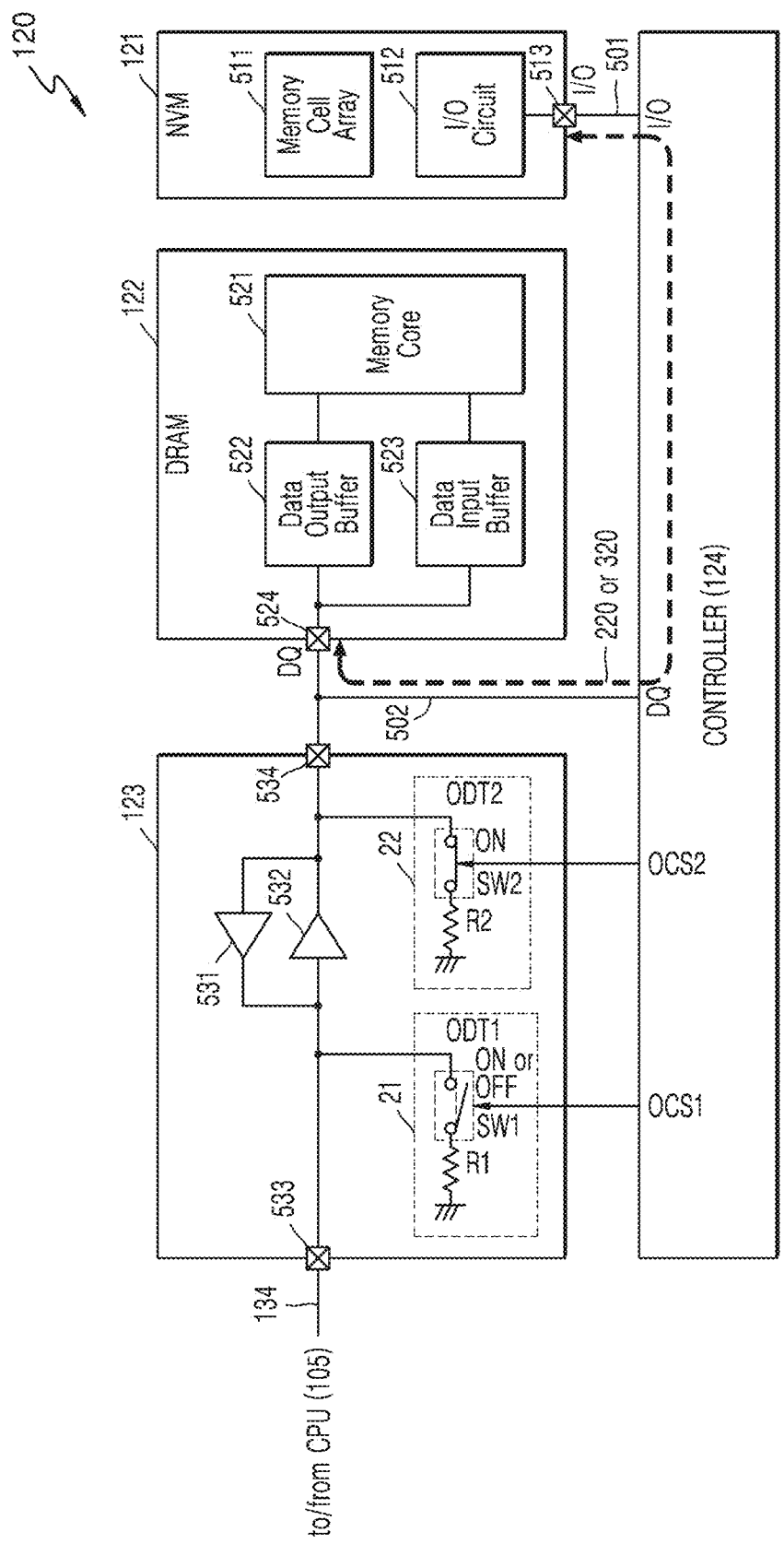
FIG. 6 is a diagram for describing a second memory module of FIG. 1, which is a non-target memory module.

FIG. 6 is a diagram for describing the second memory module 120 of FIG. 1, which is the non-target memory module.

Referring to FIG. 6, the second memory module 120 includes the NVM chip 121, the DRAM chip 122, the data buffer 123, and the controller 124 in the internal data paths 220 and 320 of FIGS. 2 and 3.

The NVM chip 121 may be implemented the same as the NVM chip 111 of the first memory module 110 (FIG. 4). The NVM chip 121 may include a memory cell array 511 and an input and output circuit 512. The DRAM chip 122 may be implemented the same as the DRAM chip 112 of the first memory module 110 (FIG. 4). The DRAM chip 122 may include a memory core 521, a data output buffer 522, and/or a data input buffer 523. The data buffer 123 may be implemented the same as the data buffer 113 of the first memory module 110 (FIG. 4). The data buffer 123 may include an output buffer 531, an input buffer 532, the first ODT circuit 21, and the second ODT circuit 22.

The CPU 105 may command an internal operation mode to the second memory module 120, which is the non-target memory module not using the memory bus 130 (FIG. 1). According to example embodiments, a command for commanding the internal operation mode of the second memory module 120 may be generated when the second memory module 120 requests the CPU 105 for an internal operation mode and the CPU 105 accepts the request. According to another example embodiment, the CPU 105 may directly generate the command for commanding the internal operation mode to the second memory module 120, by recognizing that the second memory module 120 is the non-target memory module.

Based on the internal operation mode command of the CPU 105, the controller 124 may read data DQ from the DRAM chip 122 and write the data DQ to the NVM chip 121, or may read data I/O from the NVM chip 121 and write the data I/O to the DRAM chip 122, through the internal data path 220 or 320 between the NVM chip 121 and the DRAM chip 122. Here, the controller 124 may activate the second ODT control signal OCS2, so that the second switch SW2 of the second ODT circuit 22 is turned on and the second resistor R2 is electrically connected to the second terminal 534. For example, the controller 124 may perform internal DQ termination, whereby the second resistor R2 is connected to the second terminal 434, in order to reduce or prohibit signal reflection over the internal data path 220 or 320 due to the data buffer 123. Accordingly, signal integrity on the internal data path 220 or 320 may be improved.

In the internal operation mode of the second memory module 120, the first ODT circuit 21 may electrically connect or disconnect the first resistor R1 to or from a first terminal 533. For example, the CPU 105 may control the controller 124 to reduce or prohibit signal reflection from the data bus 134 due to the second memory module 120. Here, the controller 124 may activate the first ODT control signal OCS1 so that the first switch SW1 of the first ODT circuit 21 is turned on and the first resistor R1 is electrically connected to the first terminal 533. As another example, when the controller 124 inactivates the first ODT control signal OCS1, the first switch SW1 of the first ODT circuit 11 may be turned off and the first resistor R1 may be electrically disconnected from the first terminal 533 due to the first switch SW1 which is turned off.

FIGS. 4 through 6 illustrate that the first and second ODT circuits 11, 12, 21, and 22 perform a pull-down termination operation, whereby termination resistance connected between the ground voltage VSS, and the first and second terminals 433, 434, 533, and 534 is provided. However, inventive concepts are not limited thereto. According to example embodiments, the first and second ODT circuits 11, 12, 21, and 22 may perform a pull-up termination operation, whereby termination resistance connected between a power voltage, and the first and second terminals 433, 434, 533, and 534 is provided.

FIG. 7 is a table showing an on/off operation of the first and second ODT circuits 11, 21, 12, and 22 of FIG. 1, based on operation modes.

Referring to FIGS. 1 through 7, in a read mode of the first memory module 110, which is a target memory module, the first ODT circuit 11 may be turned off not to provide termination resistance to the first terminal 433, and the second ODT circuit 12 may be turned on to provide termination resistance to the second terminal 434. Here, when the second memory module 120, which is a non-target memory module, operates in an internal operation mode, the first ODT circuit 21 may be selectively turned on/off and the second ODT circuit 22 may be turned on to perform internal DQ termination. When the second memory module 120, which is the non-target memory module, operates in a normal mode, the first ODT circuit 21 may be selectively turned on/off and the second ODT circuit 22 may be turned off.

In a write mode of the first memory module 110, which is the target memory module, the first ODT circuit 11 may be turned on to provide termination resistance to the first terminal 433 and the second ODT circuit 12 may be turned off not to provide termination resistance to the second terminal 434. Here, when the second memory module 120, which is the non-target memory module, operates in the internal operation mode, the first ODT circuit 21 may be selectively turned on/off and the second ODT circuit 22 may be turned on to perform internal DQ termination. When the second memory module 120, which is the non-target memory module, operates in the normal mode, the first ODT circuit 21 may be selectively turned on/off and the second ODT circuit 22 may be turned off.

Figure 8:
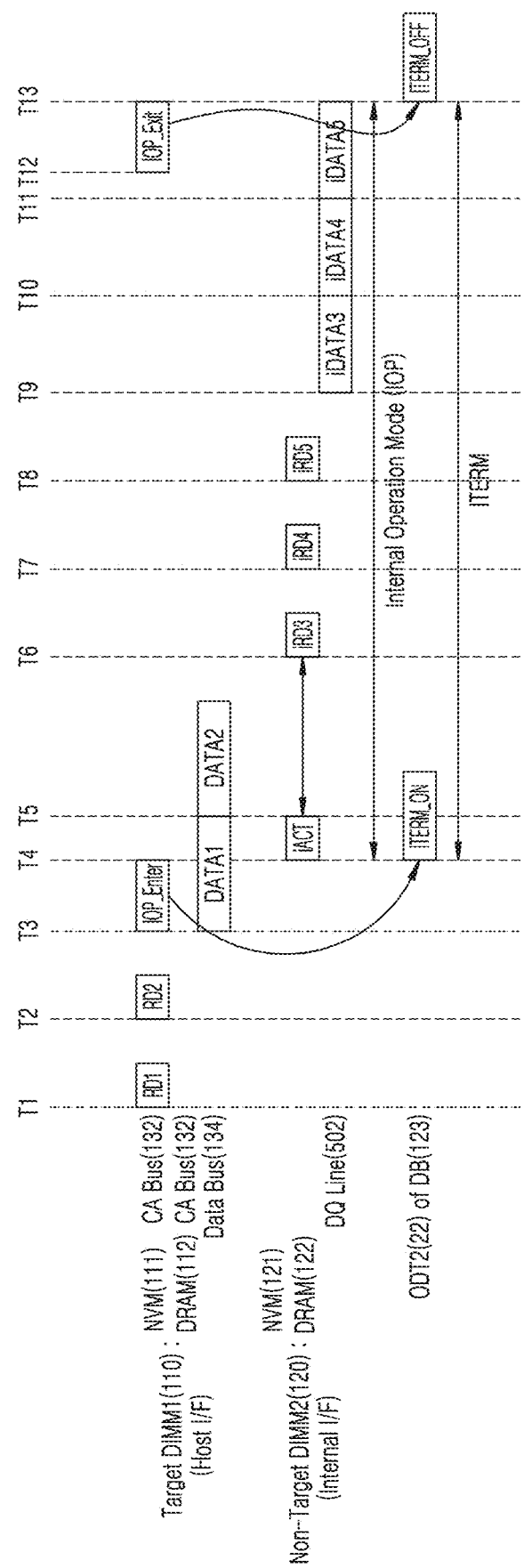
FIGS. 8 and 9 are diagrams for describing operations of the memory system of FIG. 1, according to an embodiment.
Figure 9:
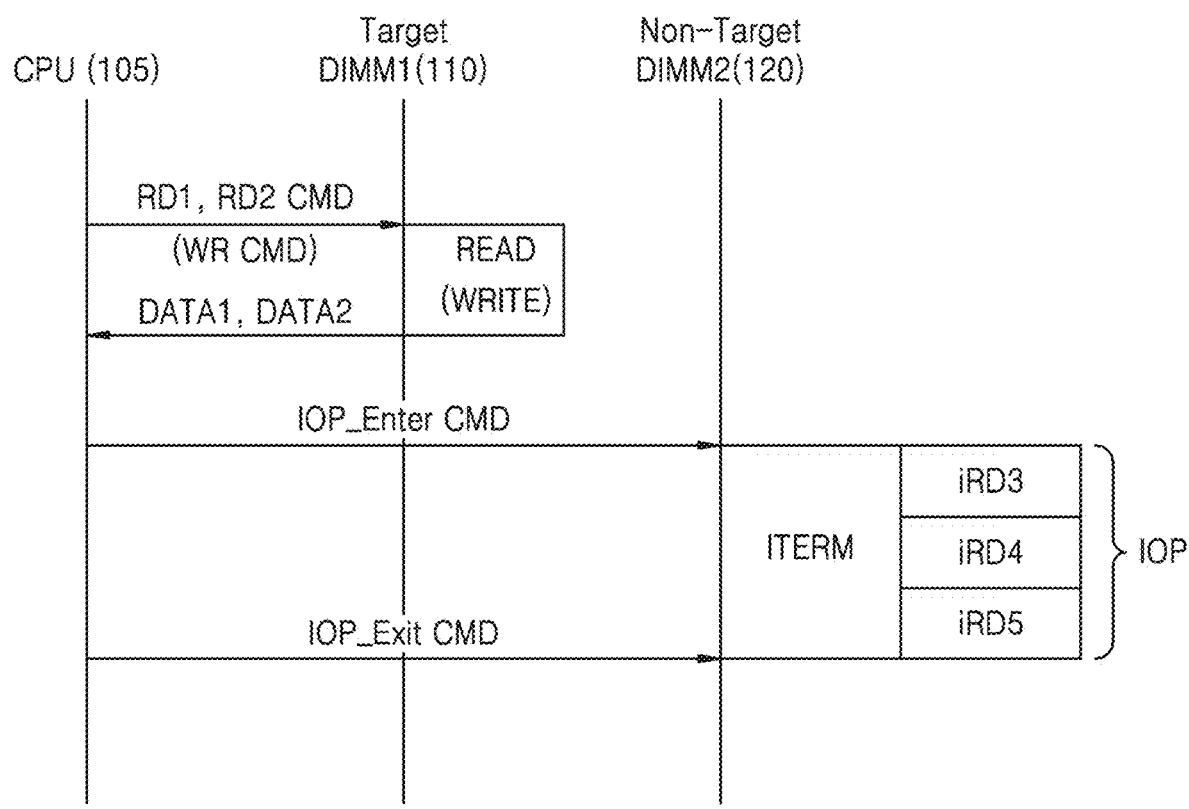

FIGS. 8 and 9 are diagrams for describing operations of the memory system 100 of FIG. 1, according to an embodiment. FIG. 8 is a timing diagram for describing the operation in a host interface of a target memory module and the operation in an internal interface of a non-target memory module of the memory system 100. FIG. 9 describes the operations of the target memory module and the non-target memory module based on the timing diagram of FIG. 8.

Referring to FIG. 8, in connection with FIGS. 1, 2, and 6, the CPU 105 may command an access to the NVM chip 111 of the first memory module 110, which is the target memory module. For example, the CPU 105 may command a read operation of the NVM chip 111. Also, the CPU 105 may command an internal operation mode of the second memory module 120, which is the non-target memory module. Here, the first memory module 110 may be included in the host interface of the memory bus 130, and the second memory module 120 may operate in the internal interface including the internal data path 220.

At points T1 and T2, the CPU 105 may generate a first read command RD1 and a second read command RD2, respectively, for the first memory module 110, through the CA bus 132 of the host interface. The first and second read commands RD1 and RD2 may be read commands with respect to the NVM chip 111.

The CPU 105 may receive first read data DATA1 read from the NVM chip 111 in response to the first read command RD1 at a point T3 through the data bus 134, and receive second read data DATA2 read from the NVM chip 111 in response to the second read command RD2 at a point T5.

The CPU 105 may generate an internal operation mode enter command IOP_Enter through the CA 132 at the point T3. The internal operation mode enter command IOP_Enter may command a start of internal data communication between the NVM chip 121 and the DRAM chip 122, internally in the second memory module 120, without involving the CPU 105. The internal operation mode enter command IOP_Enter may be generated when the second memory module 120 requests the CPU 105 for the internal operation mode and the CPU 105 accepts the request, and may be provided to the second memory module 120. Alternatively, the internal operation mode enter command IOP_Enter may be provided to the second memory module 120, after the CPU 105 determines that the second memory module 120 is the non-target memory module.

The second memory module 120 may operate in the internal operation mode IOP based on the internal operation mode end command IOP_Enter, at a point T4. The internal operation mode IOP may be set such that data is read from the DRAM chip 122 and written, e.g. programmed, to the NVM chip 121. During the internal operation mode IOP, the controller 124 may turn on the second ODT circuit 22 of the data buffer 123 to perform internal DQ termination ITERM_ON. Also, the controller 124 may generate an active command iACT to the DRAM chip 122.

After the DRAM chip 122 receives the active command iACT, the DRAM chip 122 may receive third through fifth read commands iRD3 through iRD5 provided from the controller 124 at points T6, T7, and T8, respectively. The DRAM chip 122 may output third through fifth data iDATA3 through iDATA5 respectively corresponding to the third through fifth read commands iRD3 through iRD5 at points T9, T10, and T11, through the DQ line 502. The third through fifth read data iDATA3 through iDATA5 transmitted through the DQ line 502 may be written, e.g. programmed, to the NVM chip 121 through the controller 124. The third through fifth read data iDATA3 through iDATA5 based on the third through fifth read commands iRD3 through iRD5 of the DRAM chip 122 may be used in internal data communication between the DRAM chip 122 and the NVM chip 121.

The CPU 105 may generate an internal operation mode exit command IOP_Exit through the CA bus 132 at a point T12. The internal operation mode exit command IOP_Exit may command an end of the internal operation mode IOP, in which the second memory module 120 operates.

In response to the internal operation mode exit command IOP_Exit, the controller 124 of the second memory module 120 may turn off the second ODT circuit 22 of the data buffer 123 and may not perform the internal DQ termination ITERM_OFF, at a point T13.

The internal operation mode IOP of the second memory module 120 may be performed from the points T4 through T13. For example, the internal operation mode IOP may be performed based on the internal operation mode enter command IOP_Enter at the point T3 and the internal operation mode exit command IOP_Exit at the point T12. Also, during the internal operation mode IOP, the second ODT circuit 22 of the data buffer 123 may perform the internal DQ termination ITERM to connect a termination resistor to the DQ line 502 of the internal data path 220. The internal DQ termination ITERM may reduce or prohibit signal reflection over the internal data path 220, through which the third through fifth read data iDATA3 through iDATA5 of the DRAM chip 122 is transmitted to the NVM chip 121, due to the data buffer 123, in order to improve the signal integrity.

Referring to FIG. 9, the CPU 105 may generate the first and second read commands RD1 and RD2 to the first memory module 110, and the first memory module 110 may perform a read operation READ with respect to the NVM chip 111 or the DRAM chip 112 of the first memory module 110, in response to the first and second read commands RD1 and RD2. For example, the read data DATA1 and DATA2 read from the NVM chip 111 of the first memory module 110 may be transmitted to the CPU 105. According to embodiments, the CPU 105 may generate a write command WR to the first memory module 110, and the first memory module 110 may perform a write operation WRITE with respect to the NVM chip 111 or the DRAM chip 112 of the first memory module 110, in response to the write command WR.

The CPU 105 may generate the internal operation mode enter command IOP_Enter to the second memory module 120. The second ODT circuit 22 of the data buffer 123 of the second memory module 120 may perform the internal DQ termination ITERM in response to the internal operation mode enter command IOP_Enter, so as to connect a termination resistor to the internal data path 220. Also, the second memory module 120 may operate in the internal operation mode IOP whereby internal data communication is performed between the NVM chip 121 and the DRAM chip 122 through the internal data path 220 on which the internal DQ termination ITERM is performed. For example, the third through fifth read data iDATA3 through iDATA5 (FIG. 8) based on the third through fifth read commands iRD3 through iRD5 of the DRAM chip 122 may be written, e.g. programmed, to the NVM chip 121.

Thereafter, the CPU 105 may generate the internal operation mode exit command IOP_Exit to the second memory module 120, and the second memory module 120 may end the internal DQ termination ITERM of the second ODT circuit 22 of the data buffer 123, in response to the internal operation mode exit command IOP_Exit, so as to block the termination resistor of the internal data path 220 and end the internal operation mode IOP performed between the NVM chip 121 and the DRAM chip 122.

Figure 10:
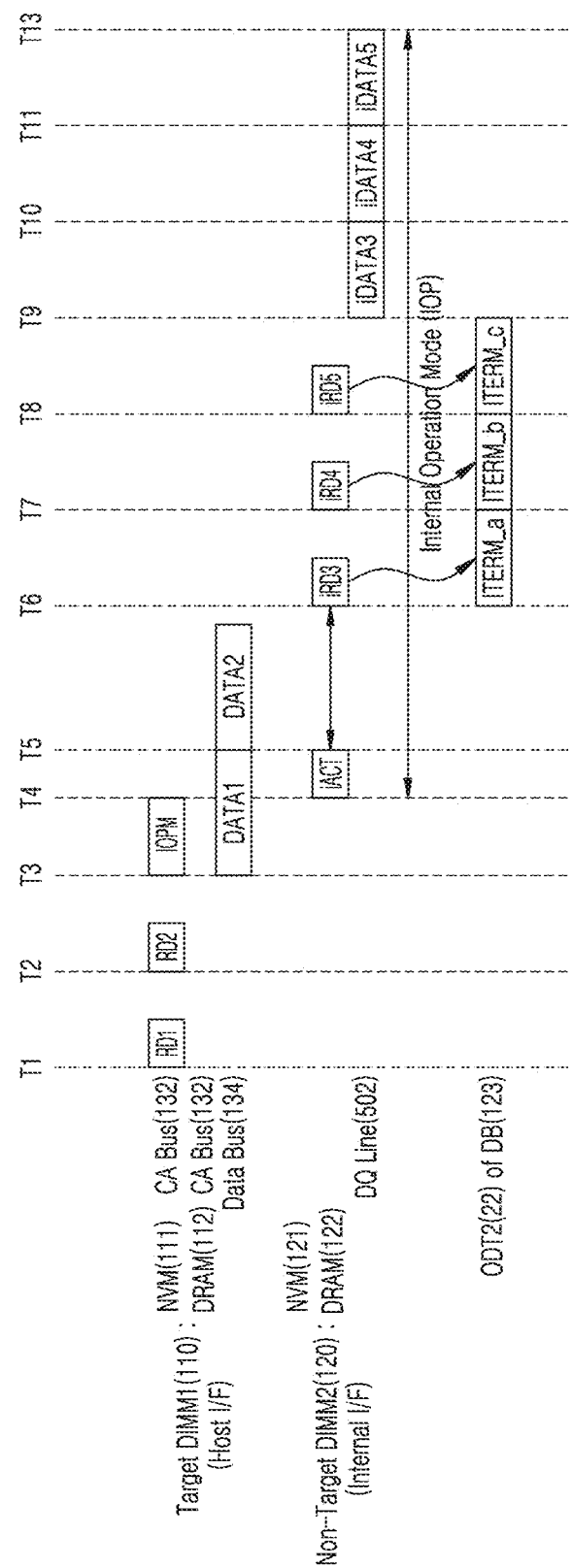
FIGS. 10 and 11 are diagrams for describing an operation of the memory system of FIG. 1, according to an embodiment.
Figure 11:
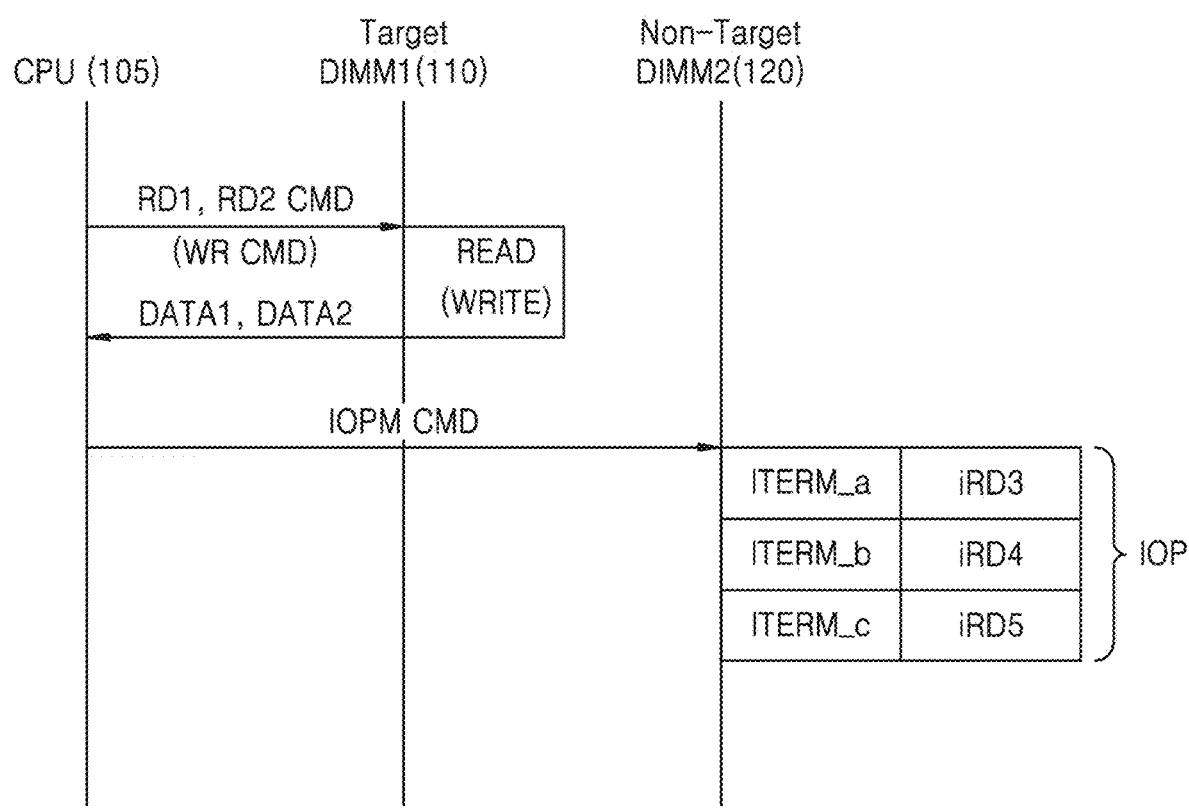

FIGS. 10 and 11 are diagrams for describing operations of the memory system 100 of FIG. 1, according to an example embodiment.

Referring to FIGS. 10 and 11, the operating methods of the memory system 100 are different from the operating methods of FIGS. 8 and 9 in terms of first through third internal DQ terminations ITERM_a, ITERM_b, and ITERM_c of the second ODT circuit 22 of the data buffer 123, during the internal operation mode IOP of the second memory module 120, which is a non-target memory module. The operating methods are the same as the operating methods of FIGS. 8 and 9 in terms of other aspects. Hereinafter, descriptions will be given by focusing on differences between the operating methods of FIGS. 10 and 11 and the operating methods of FIGS. 8 and 9.

The first memory module 110, which is the target memory module, may perform a read or a write operation in response to a read or a write command of the CPU 105, through a host interface.

The CPU 105 may generate an internal operation mode command IOPM through the CA bus 132 at a point T3. The internal operation mode command IOPM may command internal data communication between the NVM chip 121 and the DRAM chip 122, internally in the second memory module 120, without involving the CPU 105. The internal operation mode command IOPM may be generated when the second memory module 120 requests the CPU 105 for the internal operation mode IOP and the CPU 105 accepts the request. Alternatively, the internal operation mode command IOPM may be provided to the second memory module 120, after the CPU 105 determines that the second memory module 120 is the non-target memory module.

In response to the internal operation mode command IOPM at the point T3, the DRAM chip 122 may receive an active command iACT at a point T4 from the controller 124, and then, may receive third through fifth read commands iRD3 through iRD5 at points T6, T7, and T8, respectively. Thereafter, the DRAM chip 122 may output third through fifth read data iDATA3 through iDATA5 corresponding to the third through fifth read commands iRD3 through iRD5, respectively, at points T9, T10, and T11 through the DQ line 502.

During the internal operation mode IOP, the controller 124 may control the first through third internal DQ terminations ITERM_a, ITERM_b, and ITERM_c respectively corresponding to the third through fifth read commands iRD3 through iRD5 generated through the DRAM chip 122 at the points T6, T7, and T8, to be performed. For example, the controller 124 may control the first internal DQ termination ITERM_a to be performed in response to the third read command iRD3 at the point T6, may control the second internal DQ termination ITERM_b to be performed in response to the fourth read command iRD4 at the point T7, and may control the third internal DQ termination ITERM_c to be performed in response to the fifth read command iRD5 at the point T8.

The internal data communication may be performed, whereby the third through fifth read data iDATA3 through iDATA5 transmitted through the DQ line 502 of the internal data path 220 in response to the third through fifth read commands iRD3 through iRD5 is written, e.g. programmed, to the NVM chip 121 through the controller 124. Here, the controller 124 may generate the second ODT control signal OCS2 for turning on the second ODT circuit 22 of the data buffer 123 in connection with the first through third internal DQ terminations ITERM_a, ITERM_b, and ITERM_c. Accordingly, a termination resistor may be connected to the DQ line 502 of the internal data path 220, through which the third through fifth read data iDATA3 through iDATA5 corresponding to the third through fifth read commands iRD3 through iRD5, respectively, are transmitted. The first through third internal DQ terminations ITERM_a, ITERM_b, and ITERM_c may reduce or prohibit signal reflection over the internal data path 220 through which the third through fifth read data iDATA3 through iDATA5 of the DRAM chip 122 is transmitted to the NVM chip 121, due to the data buffer 123, so as to improve the signal integrity.

Figure 12:
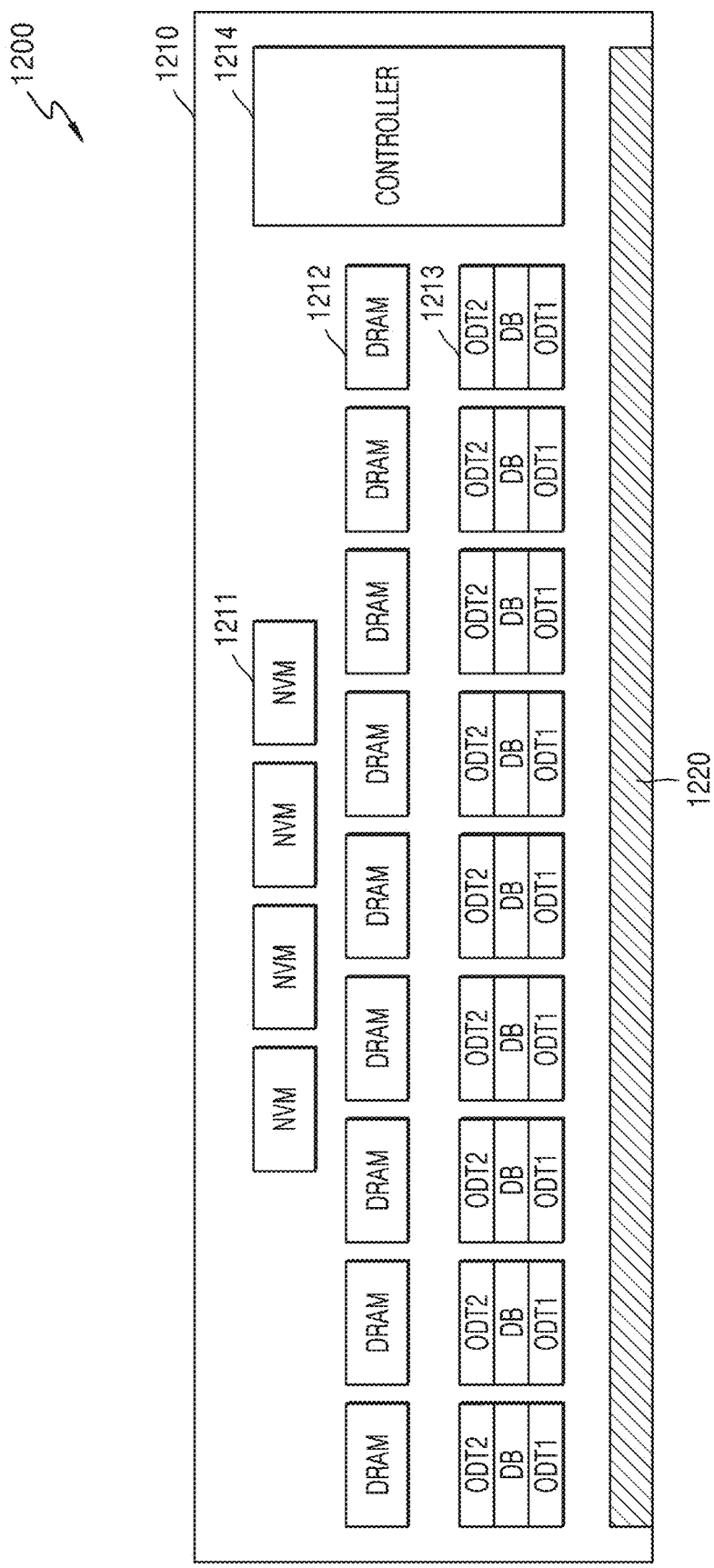
FIG. 12 is a diagram for describing a memory module according to an embodiment.

FIG. 12 is a diagram for describing a memory module according to an embodiment.

Referring to FIG. 12, the memory module may include an NVDIMM 1200. A socket terminal 1220 inserted into a duel inline memory module (DIMM) socket may be arranged on a printed circuit board 1210. Four NVM chips 1211, nine DRAM chips 1212, nine data buffers 1213 corresponding to the nine DRAM chips 1212, and a controller 1214 may be arranged on the printed circuit board 1210. According to an example embodiment, the NVM chips 1211, the DRAM chips 1212, and the nine data buffers 1213 may be arranged on the other surface of the printed circuit board 1210. The NVM chips 1211 and the DRAM chips 1212 of both surfaces of the printed circuit board 1210 may be connected to one another through via-holes of the printed circuit board 1210.

According to the example embodiment, four NVM chips 1211 and nine DRAM chips 1212 are arranged in the NVDIMM 1200. However, according to modified embodiments, various numbers of NVM chips 1211 and DRAM chips 1212 may be arranged in the NVDIMM 1200.

When the NVDIMM 1200 is a non-target memory module, an internal operation mode may be performed, whereby internal data communication is performed through an internal data path between the NVM chips 1211 and the DRAM chips 1212. During the internal operation mode, an ODT circuit of the data buffer 1213 of the NVDIMM 1200, the ODT circuit being connected to the internal data path, may be turned on to perform internal DQ termination. Based on the internal DQ termination of the NVDIMM 1200, signal reflection over the internal data path due to the data buffer 1213 may be reduced or prohibited so as to improve the signal integrity.

Figure 13:
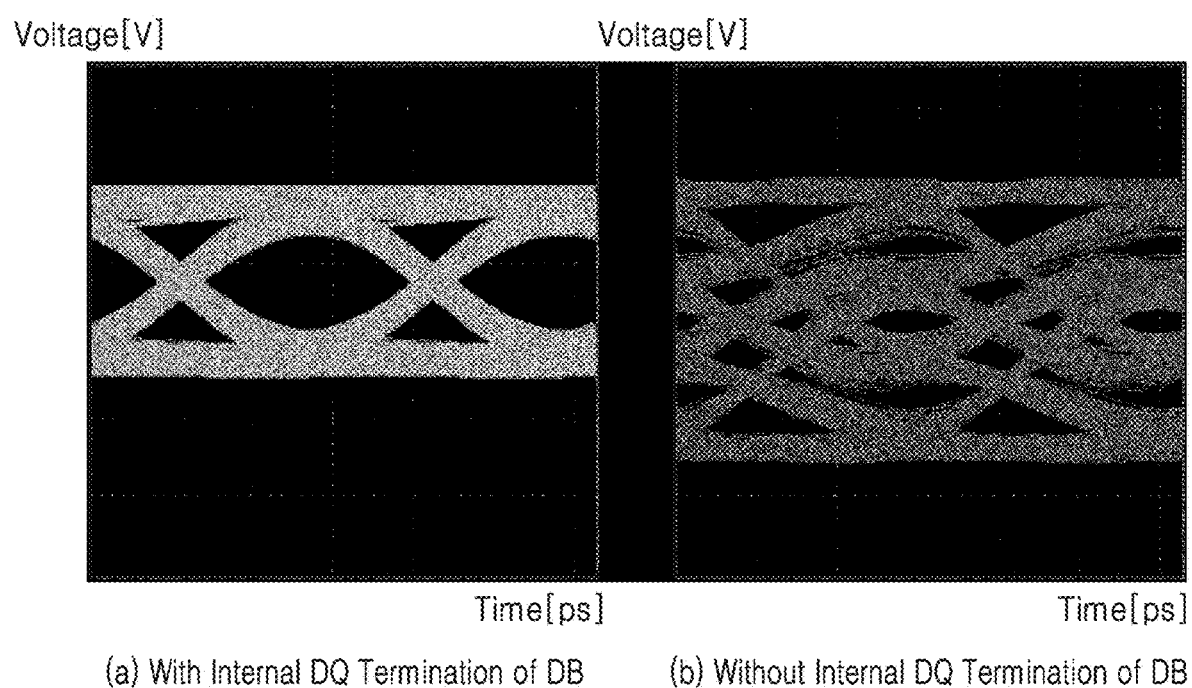
FIG. 13 is a view showing a data eye pattern based on internal data (DQ) termination of a data buffer in the memory module of FIG. 12.

FIG. 13 is a view showing a data eye pattern according to the internal DQ termination of the data buffer 1213 of the memory module 1200 of FIG. 12.

Referring to FIGS. 12 and 13, during the internal operation mode of the memory module 1200, data eye patterns when the internal DQ termination is performed and when the internal DQ termination is not performed are shown. The data eye pattern is seen as overlay of a plurality of data transitions indicating jitter due to noise. The second ODT circuit ODT2 of the data buffer 1213 may be turned on to perform the internal DQ termination on the internal data path over which internal data communication is performed between the NVM chips 1211 and the DRAM chips 1212. An eye opening area indicated as valid data when the internal DQ termination is performed is shown as a large, e.g. maximum eye, and is significantly more symmetrical without jitter, compared to an eye opening area when the internal DQ termination is not performed. This may denote that signal reflection over the internal data path due to the data buffer 1213 is reduced or prohibited, based on the internal DQ termination, so as to improve the signal integrity.

Figure 14:
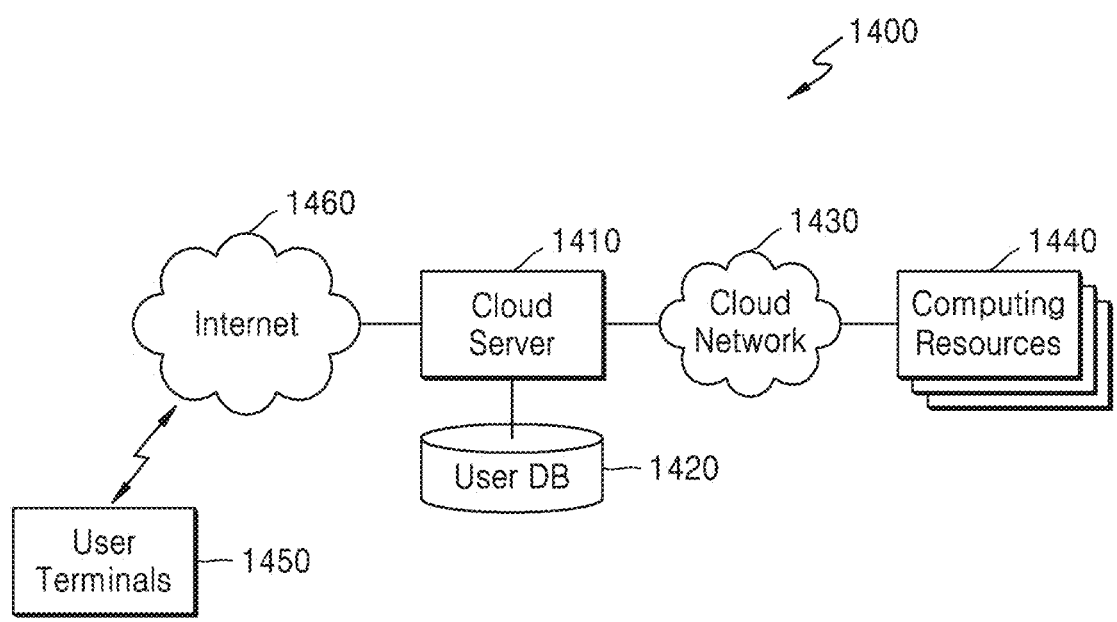
FIG. 14 is a block diagram of an example of inventive concepts, which is applied to a cloud system.

FIG. 14 is a block diagram of an applied example of inventive concepts, which is applied to a cloud system 1400.

Referring to FIG. 14, the cloud system (or a cloud computing system) 1400 may include a cloud server 1410, a user database (DB) 1420, a cloud network 1430, computing resources 1440, user terminals 1450, and the Internet 1460.

The user terminals 1450 may be provided as computers, ultra mobile personal computers (UMPCs), workstations, net-book computers, personal digital assistants (PDAs), portable computers, web tablet computers, tablet computers, wireless phones, mobile phones, smart phones, electronic books (e-books), portable multimedia players (PMP), portable game players, navigation devices, black boxes, digital cameras, digital multimedia broadcasting (DMB) players, three-dimensional televisions, digital audio recorders, digital audio players, digital picture recorders, digital picture players, digital video recorders, digital video players, storages included in a data center, devices configured to transmit and receive information in a wireless environment, any of various electronic devices included in a home network, any of various electronic devices included in a computer network, any of various electronic devices included in a telematics network, radio frequency identification devices (RFIDs), and/or any of various components included in an electronic apparatus, such as any of various components included in a computing system.

The cloud system 1400 may provide on-demand outsourcing services of the computing resources 1440 through an information network such as the Internet 1460, in response to a request of the user terminals 1450. In a cloud computing environment, a service provider may integrate, through a virtualization technique, the computing resources 1440 of data centers located in different physical locations and provide required services to users.

The service users may not install the computing resources 1440, such as applications, storages, operating systems (OSs), security, etc., in terminals owned by the users. Rather, the service users may select and use services of a virtual space generated through the virtualization technique, at a desired time for a desired amount. The user terminals 1450 of users using specific services may be connected to the cloud server 1410 through the information network, such as the Internet 1460 and/or a mobile communication network. The user terminals 1450 may receive cloud computing services, for example, a video play service, from the cloud server 1410.

The cloud server 1410 may integrate the plurality of computing resources 1440 scattered in the cloud network 1430 and provide the integrated plurality of computing resources 1440 to the user terminals 1450. The plurality of computing resources 1440 may include various types of data services, and may include data uploaded from the user terminals 1450. The cloud server 1410 may integrate data (for example, video data) distributed in various places through a virtualization technique and provide services required by the user terminals 1450.

User information of users registered in the cloud computing service may be stored in the user DB 1420. Here, the user information may include log-in information, and personal credit information, such as addresses, names, and/or other items. For example, the user information may include an index of a video. Here, the index may include a list of videos which were completely reproduced, a list of videos which are being reproduced, standstill points of the videos being reproduced, etc. The information about the videos stored in the user DB 1420 may be shared among the user terminals 1450.

For example, when a notebook computer, which is the user terminal 1450, requests a video to be reproduced and a specific, (or, alternatively, predetermined), video service is provided to the notebook computer, the user DB 1420 may store a history of reproducing the specific, (or, alternatively, predetermined), video service. When a request of reproducing the same video service is received from a smart phone of the same user, the cloud server 1410 may refer to the user DB 1420 and search for and reproduce the specific, (or, alternatively, predetermined), video service.

The cloud server 1410 may refer to the history of reproducing the specific, (or, alternatively, predetermined), video service stored in the user DB 1420. The cloud server 1410 may receive a request of reproducing the video stored in the user DB 1420, from the user terminals 1450. When the video was being reproduced before, the cloud server 1410 may reproduce the video from the start or from a previous standstill point based on selection of the user terminals 1450, wherein according to whether the cloud server 1410 reproduces the video from the start or the previous standstill point, methods of data streaming may become different. For example, when the user terminals 1450 request the video to be reproduced from the start, the cloud server 1410 may stream the video to the user terminals 1450 from a first frame of the video. However, when the user terminals 1450 request the video to be reproduced from the previous standstill point, the cloud server 1410 may stream the video to the user terminals 1450 from a frame of the standstill point.

The cloud server 1410, the user DB 1420, the computing resources 1440, and the user terminals 1450 may include the first and second memory modules 110 and 120 and the memory system 100 according to inventive concepts. The first and second memory modules 100 and 120 may be implemented by using the embodiments illustrated in FIGS. 1 through 12. The first and second memory modules 110 and 120 may include the plurality of NVM chips 111 and 121, the plurality of DRAM chips 112 and 122, the controllers 114 and 124 configured to control the internal operation mode TOP whereby internal data communication is performed between the NVM chips 111 and 121 and the DRAM chips 112 and 122, and the plurality of data buffers 113 and 123 connected to the DRAM chips 112 and 122, respectively. The controllers 114 and 124 may control the internal DQ termination to be performed on the internal data path 220 or 320 connecting the data buffers 113 and 123 and the DRAM chips 112 and 122, during the internal operation mode TOP. The memory system 100 may include the first memory module 110, which is the target memory module accessed by an external device of the memory system 100, and the second memory module 120, which is the non-target memory module not accessed by the external device. The second memory module 120 may perform the internal DQ termination on the internal data path 220 or 320, during the internal operation mode TOP whereby the internal data communication is performed by using the internal data path 220 or 320 of the second memory module 120.

While inventive concepts have been particularly shown and described with reference to example embodiments thereof, it will be understood that various changes in form and details may be made therein without departing from the spirit and scope of the following claims.

What is claimed is:

1. A non-volatile dual inline memory module (NVDIMM) comprising:
   a non-volatile memory (NVM) device;
   a dynamic random access memory (DRAM) device coupled to the NVM device through an internal data path of the NVDIMM;
   a data buffer coupled between a data bus and the internal data path, the data buffer having an internal on-die-termination (ODT) circuit connected to the internal data path; and
   a controller configured to control an internal operation mode in which the NVDIMM performs data communication between the DRAM device and the NVM device.

2. The NVDIMM of claim 1, wherein the controller is configured to use the DRAM as a cache memory of the NVM device.

3. The NVDIMM of claim 1, wherein the data buffer is configured to provide a data (DQ) termination on the internal data path when an internal data movement is performed between the DRAM device and the NVM device.

4. The NVDIMM of claim 1, wherein the NVM device, the controller and the data buffer are configured to be implemented as a single chip.

5. The NVDIMM of claim 1, wherein the controller is configured to select the NVM device based on a first chip selection signal and select the DRAM device based on a second chip selection signal.

6. The NVDIMM of claim 1, wherein the data buffer includes a first on-die-termination (ODT) circuit connected to the internal data path, the first ODT circuit being configured to perform an internal data (DQ) termination on the internal data path during the internal operation mode, and a second on-die-termination (ODT) circuit connected to the data bus, the second ODT circuit being configured to perform a data (DQ) termination on the data bus.

7. The NVDIMM of claim 6, wherein the controller is configured to control the first ODT circuit to perform the internal DQ termination in response to a first ODT control signal and control the second ODT circuit to perform the DQ termination in response to a second ODT control signal.

8. The NVDIMM of claim 6, wherein the second ODT circuit performs the DQ termination on the data bus during the internal operation mode.

9. The NVDIMM of claim 6, wherein the data buffer disconnects the data bus and the internal data path during the internal operation mode.

10. The NVDIMM of claim 1, wherein the NVM device is a phase-change random-access memory.

11. The NVDIMM of claim 1, wherein the controller includes a flash transition layer (FTL) and a mapping table.

12. The NVDIMM of claim 1, wherein the NVDIMM is included in a data center.

13. A method of operating within a non-volatile dual inline memory module (NVDIMM) including a non-volatile memory (NVM) device and a dynamic random access memory (DRAM) device, the method comprising:
    performing an internal operation mode in which the NVDIMM performs data communication between the DRAM device and the NVM device through an internal data path of the NVDIMM; and
    performing an internal data (DQ) termination on the internal data path during the internal operation mode.

14. The method of claim 13, wherein the performing of the internal operation mode comprises performing the internal operation mode when the NVDIMM is a non-target memory module.

15. The method of claim 13, wherein the performing of the internal operation mode further comprises:
    sending a request to a host of an external of the NVDIMM;
    accepting the request by the host;
    receiving an internal operation mode enter command from the host to enter the internal operation mode; and
    receiving an internal operation mode exit command from the host to end the internal operation mode.

16. The method of claim 15, wherein the data communication is performed in response to first and second read commands to the DRAM device, and
    the performing of the internal DQ termination comprises performing the internal DQ termination whenever first and second read data of the DRAM device are transmitted on the data path corresponding to the first and second read commands, respectively.

17. The method of claim 15, wherein the data communication is performed in response to first and second read commands to the NVM device, and
    the performing of the internal DQ termination comprises performing the internal DQ termination whenever first and second read data of the NVM device are transmitted on the data path corresponding to the first and second read commands, respectively.

18. A memory system comprising:
    a first non-volatile dual inline memory module (NVDIMM) coupled to a data bus, the first NVDIMM being a target memory module accessible by a host that controls the memory system; and
    a second NVDIMM coupled to the data bus, the second NVDIMM being a non-target memory module not accessed by the host,
    wherein the first NVDIMM is configured to perform data communication with the host through the data bus,
    the second NVDIMM is configured to perform an internal operation mode through an internal data path of the second NVDIMM and perform an internal data (DQ) termination on the internal data path during the internal operation mode, and
    the data communication of the first NVDIMM and the internal operation mode of the second NVDIMM are selectively performed at the same time.

19. The memory system of claim 18, wherein the second NVDIMM performs a data (DQ) termination on the data bus during the internal operation mode.

20. The memory system of claim 18, wherein the second NVDIMM enters the internal operation mode in response to an internal operation mode enter command from the host, and ends the internal operation mode in response to an internal operation mode exit command from the host.

* * * * *